United States Patent
Fujita et al.

(10) Patent No.: US 12,421,613 B2
(45) Date of Patent: Sep. 23, 2025

(54) ELECTROLYSIS SYSTEM AND METHOD OF USE OF THE SAME

(71) Applicant: ASAHI KASEI KABUSHIKI KAISHA, Tokyo (JP)

(72) Inventors: Yasuhiro Fujita, Tokyo (JP); Hisanao Aoki, Tokyo (JP); Yousuke Uchino, Tokyo (JP); Jun Ohno, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 459 days.

(21) Appl. No.: 17/998,258

(22) PCT Filed: Apr. 7, 2021

(86) PCT No.: PCT/JP2021/014830
§ 371 (c)(1),
(2) Date: Nov. 9, 2022

(87) PCT Pub. No.: WO2021/229963
PCT Pub. Date: Nov. 18, 2021

(65) Prior Publication Data
US 2023/0227985 A1    Jul. 20, 2023

(30) Foreign Application Priority Data
May 15, 2020  (JP) ................................. 2020-086126

(51) Int. Cl.
*C25B 9/19*  (2021.01)
*C25B 1/04*  (2021.01)
(Continued)

(52) U.S. Cl.
CPC .................. *C25B 9/19* (2021.01); *C25B 1/04* (2013.01); *C25B 15/025* (2021.01); *C25B 15/08* (2013.01)

(58) Field of Classification Search
None
See application file for complete search history.

(56) References Cited

U.S. PATENT DOCUMENTS 5,736,016 A * 4/1998 Allen .................... C02F 1/4674
                                                                 204/266
2003/0141200 A1* 7/2003 Harada ..................... C25B 1/04
                                                                 205/637
(Continued)

FOREIGN PATENT DOCUMENTS

EP    3604620 A1    2/2020
JP    S586989 A     1/1983
(Continued)

OTHER PUBLICATIONS

Machine translation of JP-2014-148709-A (Year: 2014).*
(Continued)

*Primary Examiner* — Harry D Wilkins, III
(74) *Attorney, Agent, or Firm* — KENJA IP LAW PC

(57) ABSTRACT

An object of the present disclosure is to suppress mixing of gases generated during an operation when supply of electric power is stopped, to thereby shorten the time required for restarting after the electric power is stopped. An electrolysis system of the present disclosure includes an electrolyzer including an electrolytic cell in which an anode and a cathode are overlapped with each other having a diaphragm interposed therebetween, and a liquid surface level control unit which is operated when an electric conduction to the electrolyzer is stopped to adjust a liquid surface level of an electrolytic solution in the electrolytic cell.

13 Claims, 10 Drawing Sheets

(51) Int. Cl.
*C25B 15/025* (2021.01)
*C25B 15/08* (2006.01)

(56) References Cited

U.S. PATENT DOCUMENTS

| | | | |
|---|---|---|---|
| 2003/0230495 A1* | 12/2003 | Anderson | C25B 1/04 |
| | | | 204/263 |
| 2007/0080071 A1 | 4/2007 | Perry, Jr. | |
| 2010/0264038 A1 | 10/2010 | Duret | |
| 2018/0250489 A1 | 9/2018 | Lin | |

FOREIGN PATENT DOCUMENTS

| | | | | |
|---|---|---|---|---|
| JP | H02125888 A | | 5/1990 | |
| JP | H05339772 A | | 12/1993 | |
| JP | H09512861 A | | 12/1997 | |
| JP | 2004169184 A | | 6/2004 | |
| JP | 5553605 B2 | | 7/2014 | |
| JP | 2014148709 A | * | 8/2014 | ............ C25B 1/10 |
| JP | 2015129344 A | | 7/2015 | |
| JP | 2015129345 A | | 7/2015 | |
| KR | 1020140035957 A | | 3/2014 | |
| WO | 2008043766 A2 | | 4/2008 | |
| WO | 2015098058 A1 | | 7/2015 | |
| WO | WO-2016208163 A1 | * | 12/2016 | ............ A61M 16/12 |
| WO | 2018182005 A1 | | 10/2018 | |

OTHER PUBLICATIONS

Jun. 29, 2021, International Search Report issued in the International Patent Application No. PCT/JP2021/014830.
Nov. 15, 2022, International Preliminary Report on Patentability issued in the International Patent Application No. PCT/JP2021/014830.
Chao Yiji et al., Chemical Engineering Vocational School Textbook, May 1990, pp. 197-201.
Li Xunren et al., Gas Filling and Gas Cylinder Inspection/Use Safety Technology, Jun. 2001, pp. 259-260.
Mar. 31, 2025, the Supplementary European Search Report issued by the European Patent Office in the corresponding European Patent Application No. 21805143.1.
Wei Shubin et al., Dictionary of Refrigeration Engineering Technology, Dec. 1987, p. 238.

* cited by examiner

ELECTROLYSIS SYSTEM AND METHOD OF USE OF THE SAME

TECHNICAL FIELD

The present disclosure relates to an electrolysis system and a method of use of the same.

BACKGROUND

Conventionally, alkaline water electrolysis in which hydrogen gas is generated from a cathode and oxygen gas is generated from an anode is known as one example of electrolysis. As an electrolyzer for alkaline water electrolysis, an electrolyzer is known in which a gas phase portion is provided on a discharge side of an electrolytic cell, and generation of a leakage current through an outlet of the electrolyzer is prevented (PTL 1), for example.

Further, in recent years, techniques utilizing renewable energy, such as wind power generation and solar power generation, have attracted attention in order to address the issues including global warming due to greenhouse gases such as carbon dioxide, decrease of fossil fuel reserves, and so on.

The nature of renewable energy is that it is subject to very large fluctuation as its output depends on climatic conditions. It is thus not always possible to transport electric power obtained by electricity generation by renewable energy to the general electric power system, and there is concern about social influences such as imbalance of electricity supply and demand, destabilization of electric power system, and so on.

Therefore, research is being conducted to convert the electric power generated from renewable energy into a form suitable for storage and transportation for utilization. Specifically, study has been made on how to generate storable and transportable hydrogen by electrolysis of water using electric power generated from renewable energy, and to use hydrogen as an energy source or material.

Hydrogen is widely used industrially in the fields of, for example, petroleum refining, chemical synthesis, and metal refining, and in recent years it can be used in many fields such as in hydrogen stations for fuel cell vehicles (FCVs), smart communities, and hydrogen power plants. Accordingly, there is high expectation for the development of technology to obtain, in particular, hydrogen from renewable energy.

Methods for electrolysis of water include solid polymer electrolytic solution water electrolysis, high-temperature steam electrolysis, and alkaline water electrolysis. Of these, alkaline water electrolysis is regarded as one of the most promising because of its industrialization over decades, large-scale availability, and inexpensiveness as compared to other water electrolysis systems.

However, in order to adopt alkaline water electrolysis as a means for storing and transporting energy in the future, it is necessary to enable efficient and stable water electrolysis using electric power with large fluctuation in output as described above, and various issues associated with electrolytic cells and devices for alkaline water electrolysis need to be resolved.

For example, in order to address the issue of improving the electric power consumption rate for hydrogen production by suppressing the bath voltage in alkaline water electrolysis, it is known to be effective to use a structure in which the gap between the membrane and the electrodes is substantially eliminated, which is called a zero-gap structure, as the structure of the electrolytic cell (see PTL 1 and PTL 2). With the zero-gap structure, by rapidly escaping the generated gas through the pores of an electrode to the side opposite to the membrane side of the electrode, it is possible to reduce the distance between the electrodes while minimizing gas accumulation near the electrodes, thereby keeping bath voltage low. The zero-gap structure is very effective in suppressing bath voltage and is adopted in various electrolysis devices.

CITATION LIST

Patent Literature

PTL 1: JP H02-125888 A
PTL 2: JP 5553605 B
PTL 3: WO 2015/098058 A

SUMMARY

Technical Problem

Supply of electric power to an electrolysis system may be stopped for maintenance or the like. Electric power may be stopped for a long time, and electrolysis systems in recent years are required to be restarted after the electric power is stopped.

However, the purpose of PTL 1 is to prevent occurrence of a leakage current during an operation where electric conduction to an electrolyzer is performed, and does not disclose situations where the electric conduction is stopped and the electrolyzer is restarted.

Therefore, an object of the present disclosure is to suppress mixing of gases generated during an operation when supply of electric power is stopped. In particular, an object of the present disclosure (I) is to suppress mixing of gases generated during an operation when supply of electric power is stopped, to thereby shorten the time required for restarting after the electric power is stopped.

In addition, an electrolysis apparatus performs an electrolysis operation of an electrolytic solution relying on a variable power source such as solar or wind power source. When the variable power source is weakened or stopped, an electrolysis operation is stopped. The electrolytic solution during the electrolysis operation and the gases generated during the operation remain in the form of a gas layer in an electrode compartment of the electrolyzer. As a result, a part (both surfaces) of the diaphragm that partitions the electrode compartment into an anode compartment and a cathode compartment is exposed to the gas layer present in each electrode compartment. When the diaphragm is exposed to the gas layer in this way, a slight amount of the gas in each of the electrode compartments may diffuse through the diaphragm into the other electrode compartment. As a result, there is a possibility that the hydrogen concentration in oxygen in the anode compartment and the oxygen concentration in hydrogen in the cathode compartment locally increase, for example.

Therefore, an object of the present disclosure (II) is to provide a method of operating an electrolysis apparatus which can suppress diffusion and mixing of gases between electrode compartments through a diaphragm when electrolysis is stopped.

Solution to Problem

The present disclosure thus provides the following. In this specification, the inventions described in [1] to [12] may be referred to as the present disclosure (I), and the inventions described in [13] to [17] may be referred to as the present disclosure (II).

[1]
An electrolysis system comprising:
an electrolyzer in which an anode and a cathode are overlapped one another having a diaphragm interposed therebetween; and
a liquid surface level control unit that is operated when an electric conduction to the electrolyzer is stopped to adjust a liquid surface level of an electrolytic solution in the electrolytic cell.

[2]
The electrolysis system according to [1], wherein the liquid surface level control unit is a unit for controlling the liquid surface level so as to be above an uncovered upper end of the diaphragm in a vertical direction.

[3]
The electrolysis system according to [1] or [2], wherein the liquid surface level control unit is a circulation pump for the electrolytic solution.

[4]
The electrolysis system according to any one of [1] to [3], wherein a time duration during which the liquid surface level control unit is operated is longer than 0% and 20% or shorter of a time duration during which the electric conduction is stopped which is taken to be 100%.

[5]
The electrolysis system according to any one of [1] to [4], wherein the liquid surface level control unit adjusts the liquid surface level according to the time duration during which the electric conduction is stopped.

[6]
The electrolysis system according to any one of [1] to [5], wherein the liquid surface level control unit adjusts the liquid surface level according to a temperature of the electrolytic solution.

[7]
The electrolysis system according to any one of [1] to [6], wherein the liquid surface level control unit adjusts the liquid surface level according to a liquid head pressure of the electrolytic solution.

[8]
The electrolysis system according to any one of [1] to [7], wherein the liquid surface level control unit adjusts the liquid surface level according to an electric resistance value.

[9]
The electrolytic system according to any one of [1] to [8], wherein the liquid surface level control unit adjusts the liquid surface level according to the liquid surface level of the electrolytic solution in the electrolytic cell.

[10]
The electrolysis system according to [9], wherein the liquid surface level control unit is a unit that injects the electrolytic solution into the electrolytic cell by a liquid feed pump when the liquid surface level of the electrolytic solution is positioned below the uncovered upper end of the diaphragm in the vertical direction.

[11]
The electrolysis system according to any one of [1] to [10], wherein the electrolysis system is for alkaline water electrolysis.

[12]
A method of use of the electrolysis system according to any one of [1] to [11].

[13]
A method of operating an electrolysis apparatus comprising an anode compartment having an anode and a cathode compartment having a cathode, partitioned by a diaphragm, the method comprising:
an electric conduction step in which electrolysis of an electrolytic solution in the anode compartment and the cathode compartment is performed; and
a stopped step in which the electrolysis of the electrolytic solution in the anode compartment and the cathode compartment is stopped,
wherein a liquid surface of the electrolytic solution in the anode compartment and/or the cathode compartment is positioned above an uncovered upper end of the diaphragm in a vertical direction in the stopped step.

[14]
The method of operating an electrolysis apparatus according to [13], wherein, in the stopped step, the liquid surfaces of the electrolytic solution in the anode compartment and the cathode compartment are monitored by a liquid level gauge for measuring the liquid surfaces, and when the liquid surfaces of the anode compartment and the cathode compartment are positioned below the uncovered upper end of the diaphragm in the vertical direction, the electrolytic solution is injected into the anode compartment and/or the cathode compartment by a liquid feed pump so that the liquid surface of the anode compartment and/or the cathode compartment is positioned above the uncovered upper end of the diaphragm in the vertical direction.

[15]
The method of operating an electrolysis apparatus according to [13] or [14], wherein the liquid feed pump is continuously or intermittently operated in the stopped step so that the liquid surface of the anode compartment and/or the cathode compartment is positioned above the uncovered upper end of the diaphragm in the vertical direction.

[16]
The method of operating an electrolysis apparatus according to any one of [13] to [15],
wherein the electrolysis apparatus comprises a storage tank for storing the electrolytic solution, the storage tank being positioned above an electrolyzer in the electrolysis apparatus in the vertical direction, and
the electrolytic solution in the storage tank is injected into the anode compartment and/or the cathode compartment by means of gravity in the stopped step so that the liquid surface of the anode compartment and/or the cathode compartment is positioned above the uncovered upper end of the diaphragm in the vertical direction.

[17]
The method of operating an electrolysis apparatus according to any one of [13] to [16], wherein at least a part of the cathode is present above the uncovered upper end of the diaphragm in the vertical direction.

Advantageous Effect

Because the electrolysis system of the present disclosure has the above-described configuration, it is possible to prevent gases generated during an operation from mixing when supply of electric power is stopped. In particular, according to the present disclosure (I), it is possible to prevent gases generated during an operation from mixing when supply of electric power is stopped, to thereby shorten the time required for restarting after the electric power is stopped. Further, according to the present disclosure (II), it is possible to provide a method of operating an electrolysis apparatus which can suppress diffusion and mixing of gases between electrode compartments through a diaphragm when electrolysis is stopped.

BRIEF DESCRIPTION OF THE DRAWINGS

In the accompanying drawings:

FIG. 4 is a schematic diagram illustrating the inside of the electrolytic cell when electric conduction to the electrolysis system is stopped; wherein

FIG. 7 is a diagram schematically illustrating a cathode compartment in one example of an electrolyzer in an electrolysis apparatus, wherein

DETAILED DESCRIPTION

The following provides details of an embodiment of the present disclosure (hereinafter referred to as "present embodiment"). However, the present disclosure is not limited to the following embodiment and may be implemented with various alterations within the essential scope thereof. In the present specification, among present embodiments, an embodiment of the present disclosure (I) may be referred to as a present embodiment (I), and an embodiment of the present disclosure (II) may be referred to as a present embodiment (II).

An electrolysis system of the present embodiment (I) includes an electrolyzer including an electrolytic cell in which an anode and a cathode are overlapped with each other having a diaphragm interposed therebetween, and a liquid surface level control unit which is operated when an electric conduction to the electrolyzer is stopped to adjust a liquid surface level of an electrolytic solution in the electrolytic cell. An electrolysis system (electrolysis apparatus) used in an operation method of the present embodiment (II) includes an anode compartment having an anode and a cathode compartment having a cathode, partitioned by a diaphragm, wherein a liquid surface of the electrolytic solution in the anode compartment and/or the cathode compartment is positioned above an uncovered upper end of the diaphragm in the vertical direction when electrolysis of the electrolytic solution in the anode compartment and the cathode compartment is stopped.

Figure 1:
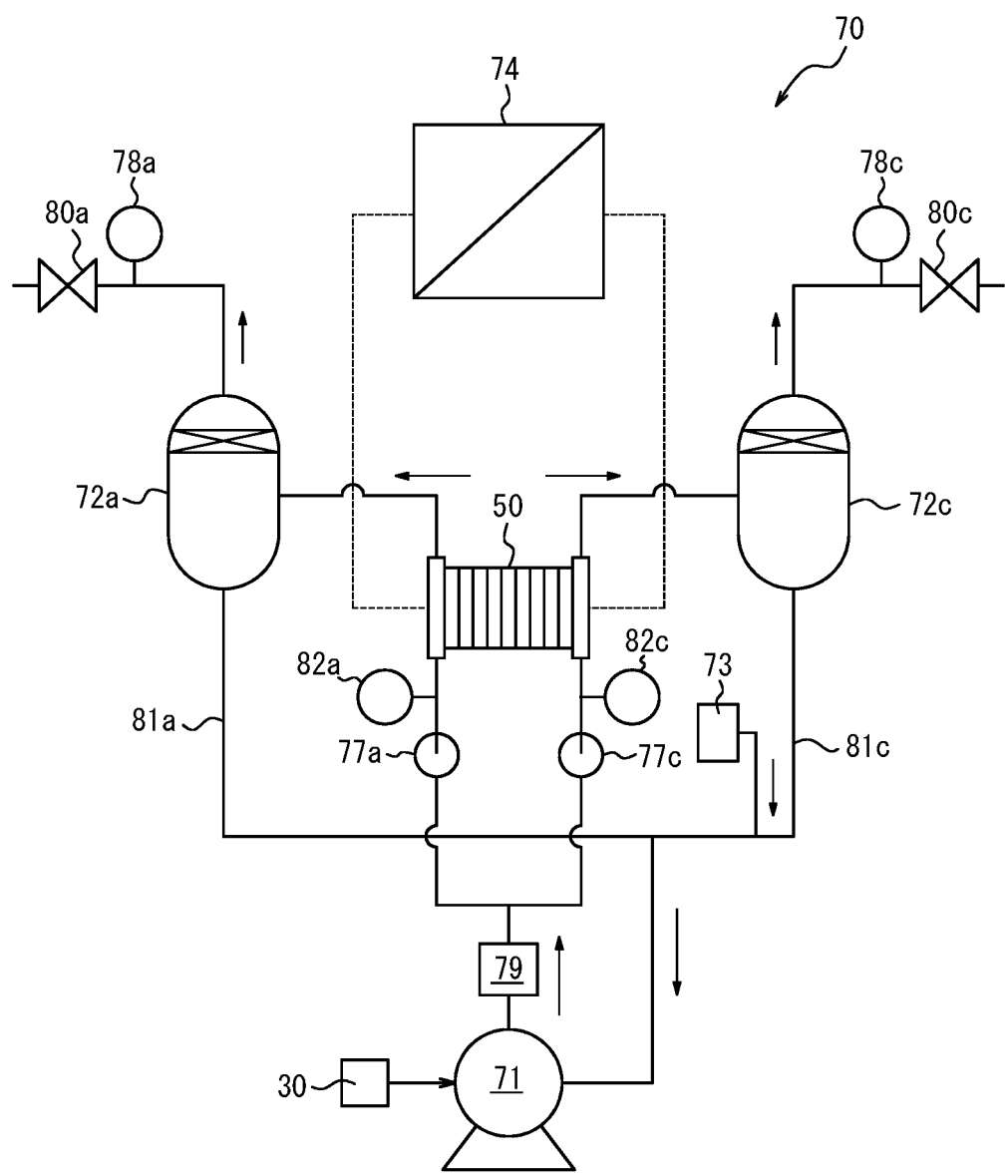
FIG. 1 is a schematic diagram illustrating one example of an electrolysis system of a present embodiment.

FIG. 1 is a schematic diagram illustrating one example of an electrolysis system of the present embodiment.

The electrolysis system 70 includes an electrolyzer 50. The electrolysis system 70 may further include a liquid surface level control unit 30. The electrolysis system 70 may further include a supply power source 74, a liquid feed pump 71 for circulating an electrolytic solution, gas-liquid separation tanks 72 (an anode gas separation tank 72a, a cathode gas separation tank 72c) for separating between the electrolytic solution and gases (e.g., hydrogen, oxygen, etc.), a water replenisher 73 to replenish water consumed by electrolysis, concentration meters, flow meters 77, pressure gauges 78, a heat exchanger 79, piping 81, pressure control valves 80, and the like. In the case where the liquid surface level control unit 30 is a circulation pump for the electrolytic solution, the liquid feed pump 71 also functioning as the liquid surface level control unit may be used or a pump different from the liquid feed pump 71 may be used.

The arrows in FIG. 1 indicate the directions along which the electrolytic solution or gases flows.

The electrolyzer may be an electrolyzer including an electrolytic cell in which an anode and a cathode are overlapped with each other having a diaphragm interposed therebetween. The electrolyzer may include an anode compartment having an anode and a cathode compartment having a cathode, partitioned from each other by a diaphragm.

The electrolyzer may be of a unipolar type or of a bipolar type, to which at least one electrode element is connected.

Figure 2:
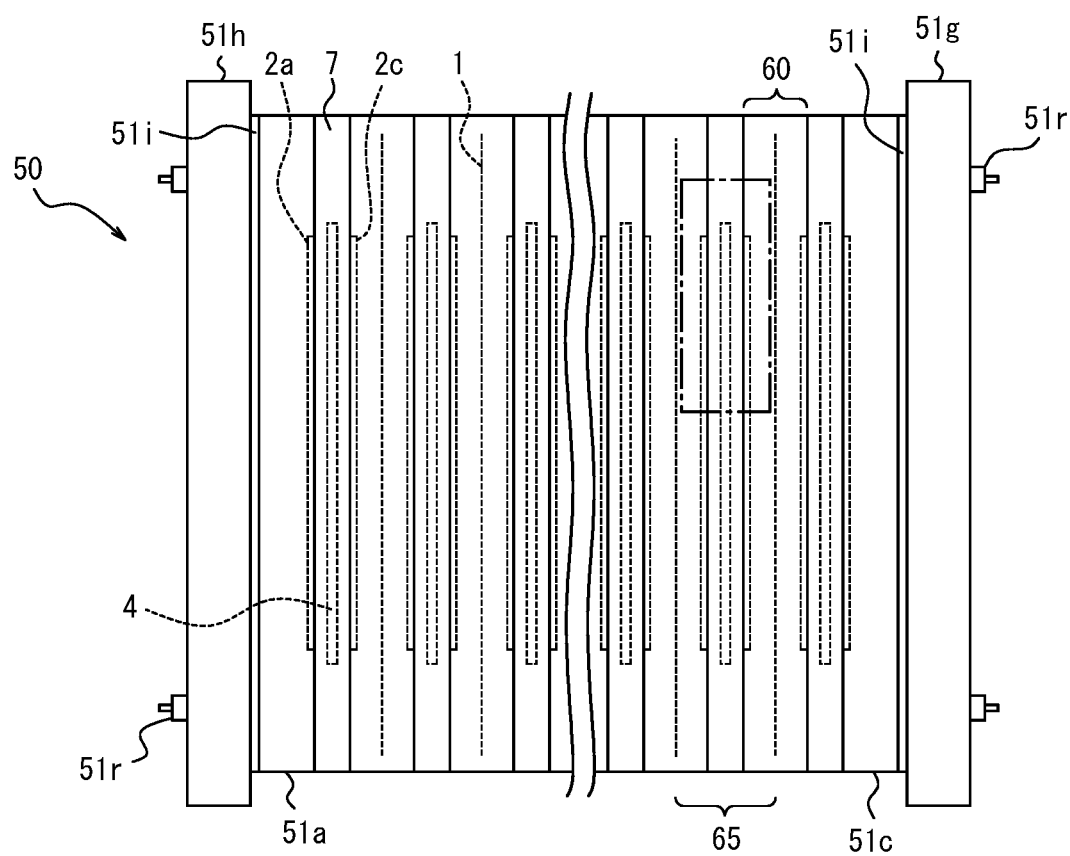
FIG. 2 is an overall schematic view of one example of an electrolyzer.

For example, the bipolar method is one method of connecting a large number of bipolar elements in series and connecting them to a power supply and is a method in which a plurality of bipolar elements 60 each having an anode 2a as one surface thereof and a cathode 2c as one surface thereof are arranged in the same orientation and connected in series having diaphragms 4 interposed therebetween, and only both ends thereof are connected to the power supply (FIG. 2). The electrolyzer is exemplified by an electrolyzer having at least one structure in which, in two adjacent elements (e.g., two of an anode terminal element 51a, a bipolar element 60, and a cathode terminal element 51c), an anode 2a of one element and a cathode 2c of the other element are arranged side by side having a diaphragm 4 interposed therebetween, for example. Preferably, a diaphragm 4 is provided between every two adjacent elements in the electrolyzer.

Bipolar electrolyzers have a feature of enabling a small power supply current and can be used to produce a large quantity of a compound, specific substance, or the like through electrolysis in a short time. Because power supply equipment having low current and high voltage is cheaper and more compact when power supply equipment having the same power is compared, the bipolar type is more preferable than the monopolar type from an industrial viewpoint.

An example of the electrolyzer 50 is illustrated in FIG. 2.

The electrolyzer 50 illustrated in FIG. 2 is a bipolar electrolyzer. The bipolar electrolyzer may be constructed by stacking a required number of elements 60 (for example, bipolar elements).

The bipolar electrolyzer includes, from one end thereof, a fast head 51h, an insulating plate 51i, and an anode terminal element 51a that are arranged in order, and further includes an anode-side gasket portion 7, a diaphragm 4, a cathode-side gasket portion 7, and an element (e.g, bipolar element)

that are arranged in this order. In this case, the element 60 is arranged such that the corresponding cathode 2c faces toward the anode terminal element 51a side. Components from anode-side gasket portions 7 up to elements 60 are repeatedly arranged as many times as required for the designed production quantity. After components from the anode-side gasket portion 7 up to the element 60 have been arranged repeatedly the required number of times, an anode-side gasket portion 7, a diaphragm 4, and a cathode-side gasket portion 7 are arranged again, and finally a cathode terminal element 51c, an insulating plate 51i, and a loose head 51g are arranged in this order. The entire structure is then tightened together with a tightening means such as tie rods 51r (see FIG. 2) or a hydraulic cylinder to form an electrolyzer 50.

The elements 60 each include an anode 2a, a cathode 2c, a partition wall 1 separating the anode 2a and the cathode 2c from each other, and an outer frame 3 bordering the partition wall 1. The partition wall 1 may be conductive and the outer frame 3 may extend along the outer periphery of the partition wall 1 such as to border the partition wall 1. The elements 60 are stacked one another having the diaphragms 4 interposed therebetween.

The order of arrangement of the electrolyzer can be arbitrarily selected from either the anode 2a side or the cathode 2c side and is not limited to the above order.

It is to be note that a bipolar electrolyzer including a bipolar element or the like may be described as one example in the present specification, but the present disclosure is not limited to the bipolar electrolyzer.

As illustrated in FIG. 2, in the electrolyzer 50, the elements 60 are disposed between the anode terminal element 51a and the cathode terminal element 51c. The diaphragms 4 are disposed between the anode terminal element 51a and the element 60, between adjacent elements 60, and between the element 60 and the cathode terminal element 51c.

Figure 5:
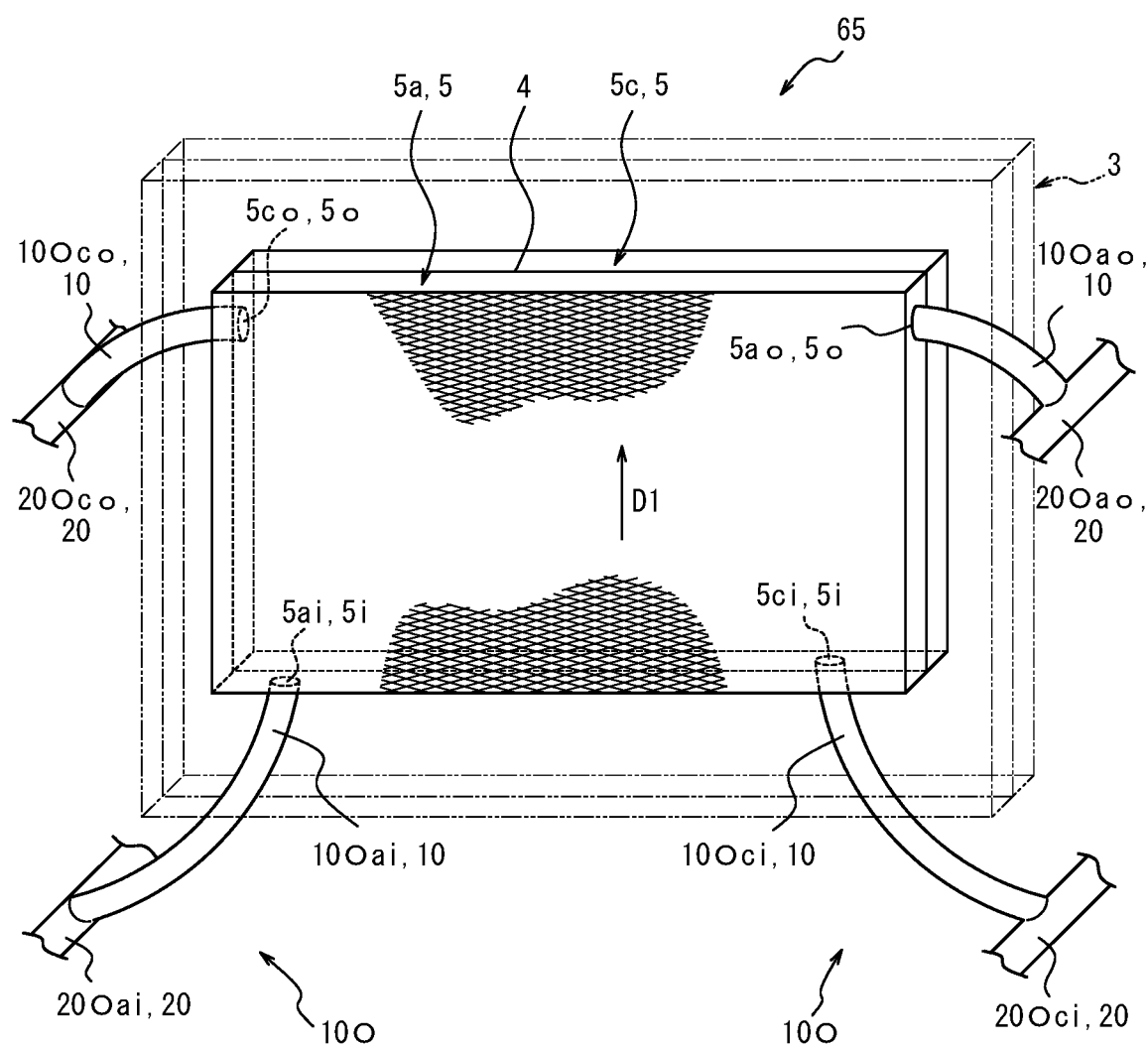
FIG. 5 is a perspective view illustrating an electrolysis compartment, a header, and piping in one example of an external header type electrolyzer.
Figure 6:
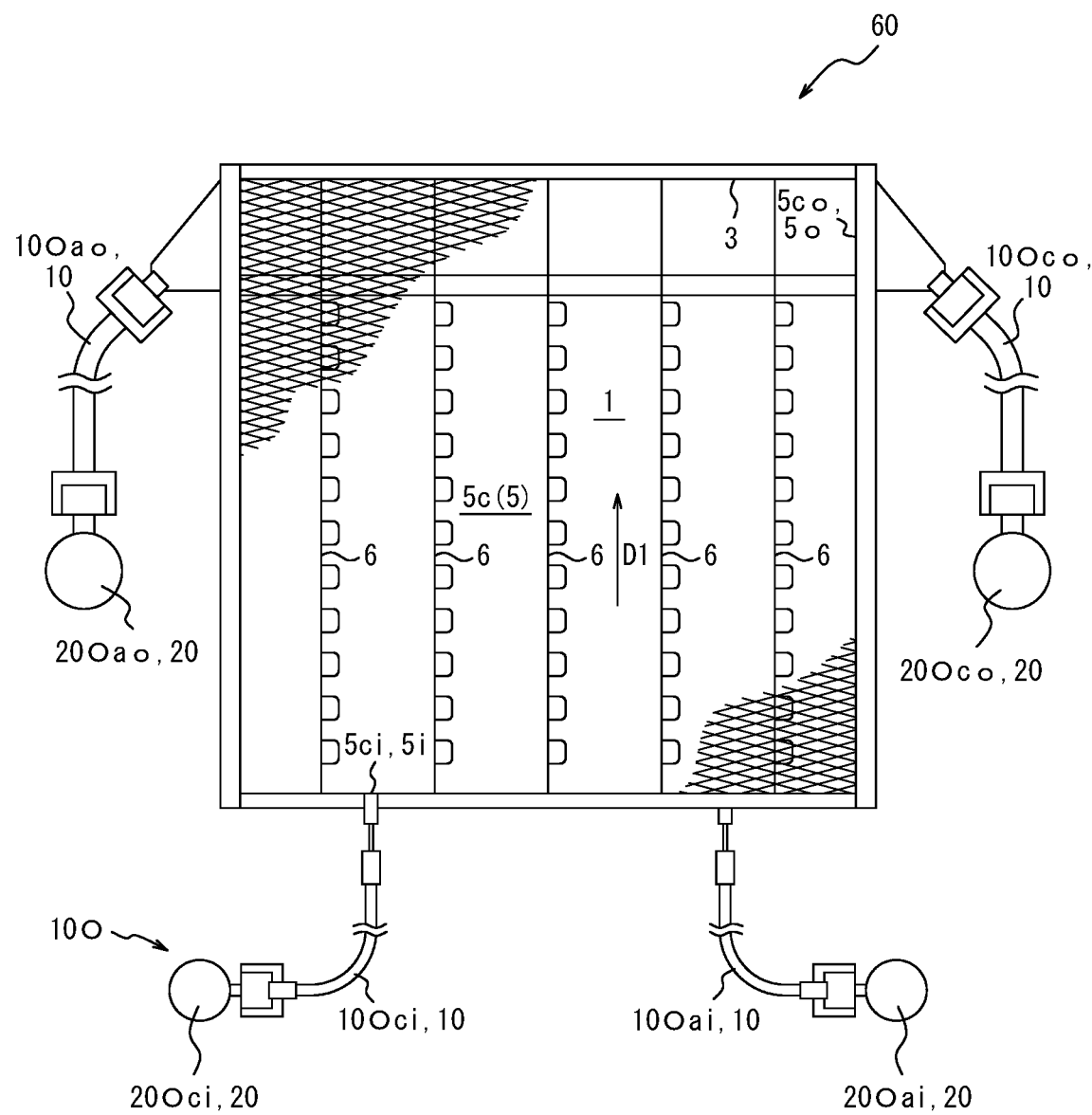
FIG. 6 is a plan view illustrating one example of an external header type electrolyzer in an electrolysis apparatus.

In the above electrolyzer, usually, each element 60 may be used so that a given direction D1 along the partition wall 1 is the vertical direction. Specifically, if the shape of the partition wall 1 in plan view is a rectangular shape as illustrated in FIG. 5 and FIG. 6, the element 60 may be used so that the given direction D1 along the partition wall 1 is the same direction as the direction of one pair of sides of the two pairs of opposite sides (see FIG. 5 and FIG. 6).

Figure 3:
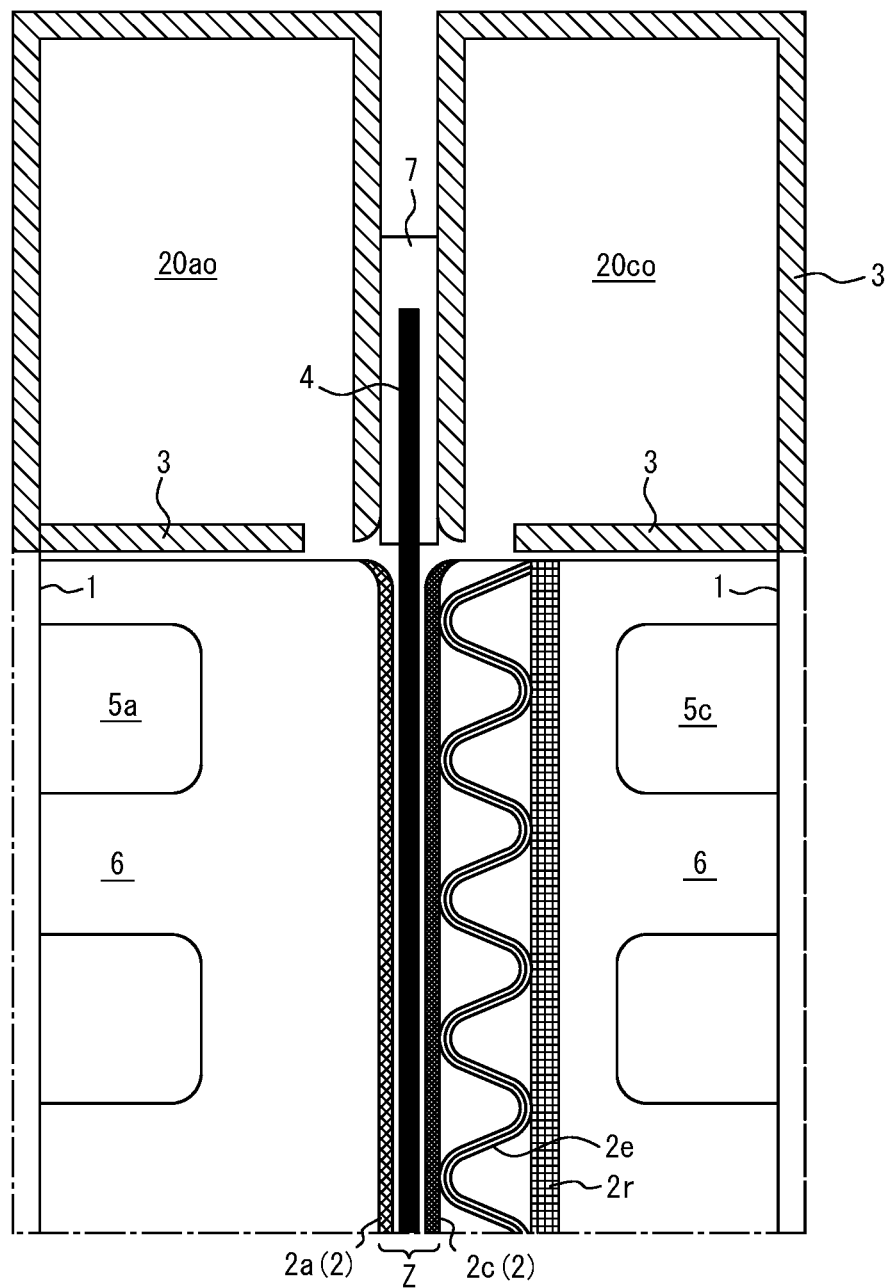
FIG. 3 is a schematic diagram illustrating one example of a cross section inside the electrolytic cell in the portion of the dotted square frame of FIG. 2.

In the above electrolyzer 50, a partition wall 1, an outer frame 3, a diaphragm 4, and a gasket 7 define an electrode compartment 5 through which an electrolytic solution passes (FIG. 3).

In the example illustrated in FIGS. 2 to 3, each electrode compartment 5 has a rectangular parallelepiped shape as a result of a rectangular partition wall 1 and a rectangular diaphragm 4 being arranged in parallel and as a result of an inner surface at a partition wall 1 side of a rectangular parallelepiped outer frame 3 provided at the periphery of the partition wall 1 being perpendicular to the partition wall 1.

In the present embodiment, in particular a portion between the partition walls 1 of two adjacent elements 60 and a portion between the partition walls 1 of each terminal element and of the adjacent element 60 in the electrolyzer 50 are respectively referred to as an electrolytic cell 65 (FIG. 3). The electrolyzer 50 includes an electrolytic cell 65 in which an anode 2a and a cathode 2c are overlapped with each other having a diaphragm 4 interposed therebetween. Each electrolytic cell 65 preferably includes a partition wall 1, an anode compartment 5a, and an anode 2a of one element; a diaphragm 4; and a cathode 2c, a cathode compartment 5c, and a partition wall 1 of the other bipolar element.

In an electrolytic cell 65, a diaphragm 4 and a non-gas permeable membrane may be provided at a portion sandwiched between adjacent elements 60 and the like. For example, the portion sandwiched between the anode 2a and the cathode 2c may be an ion-permeable diaphragm 4, and a non-gas permeable membrane that does not allow ions, gases, or an electrolytic solution to pass therethrough may be used closer to the outer frame 3 from the diaphragm.

Further, an anode liquid distribution pipe for supplying an electrolytic solution to the anode compartment and a cathode liquid distribution pipe for supplying the electrolytic solution to the cathode compartment may be provided on the lower side in the vertical direction, and an anode liquid collector pipe 20ao for discharging the electrolytic solution from the anode compartment and a cathode liquid collector pipe 20co for discharging the electrolytic solution from the cathode compartment may be provided on the upper side in the vertical direction.

Each electrode compartment 5 may have an electrolytic solution inlet 5i for introducing electrolytic solution into the electrode compartment 5 and an electrolytic solution outlet 5o for discharging electrolytic solution from the electrode compartment 5 at the boundary with the outer frame 3 (FIGS. 5 and 6). More specifically, the anode compartment 5a is provided with an anode electrolytic solution inlet 5ai for introducing the electrolytic solution into the anode compartment 5a and an anode electrolytic solution outlet 5ao for discharging the electrolytic solution discharged from the anode compartment 5a. Similarly, the cathode compartment 5c may be provided with a cathode electrolytic solution inlet 5ci for introducing the electrolytic solution into the cathode compartment 5c and a cathode electrolytic solution outlet 5co for discharging the electrolytic solution discharged from the cathode compartment 5c.

In the anode compartment 5a and the cathode compartment 5c, an internal distributor may be provided for uniformly distributing the electrolytic solution within the surfaces of electrodes inside the electrolyzer 50. In addition, the electrode compartment 5 may include a baffle plate having a function of restricting the flow of the liquid inside the electrolyzer 50. Further, the anode compartment 5a and the cathode compartment 5c may be provided with a protrusion for forming a Karman vortex in order to uniformize the concentration and the temperature of the electrolytic solution inside the electrolyzer 50 and to promote defoaming of the gases adhered to the electrodes 2 and the diaphragm 4.

From the viewpoint of reducing the inter-electrode distance, enhancing the rigidity of the anode and the cathode, forming the structuring resistant to deformation even when the two electrodes are pressed against each other, and controlling the direction of the electrolytic solution flowing in the electrode compartment, a rectifying plate 6 (rib) may be provided to each electrode (FIG. 3). Further, for the same reason, a structure of at least three layers may be adopted in which a current collector 2r is attached at the tip of a rectifying plate 6 (rib), a conductive elastic body 2e is attached at an upper surface side of the current collector 2r (i.e., at an opposite side to the partition wall 1 side), and an electrode 2 is stacked at an upper surface side thereof (i.e., at a part that is adjacent to the conductive elastic body 2e and becomes the diaphragm 4 side).

Further, in the electrolyzer 50 of one example, the rectifying plate 6 has substantially the same length as the height of the electrode compartment 5, is provided so as to be perpendicular to the partition wall 1, and has through-holes at a predetermined pitch in the direction of the flow of the electrolytic solution.

(Liquid Surface Level Control Unit)

The electrolysis system of the present embodiment preferably includes a liquid surface level control unit 30.

Here, an electrolyzer in an electric conduction stop state will be described with reference to FIG. 4.

Figure 4A:
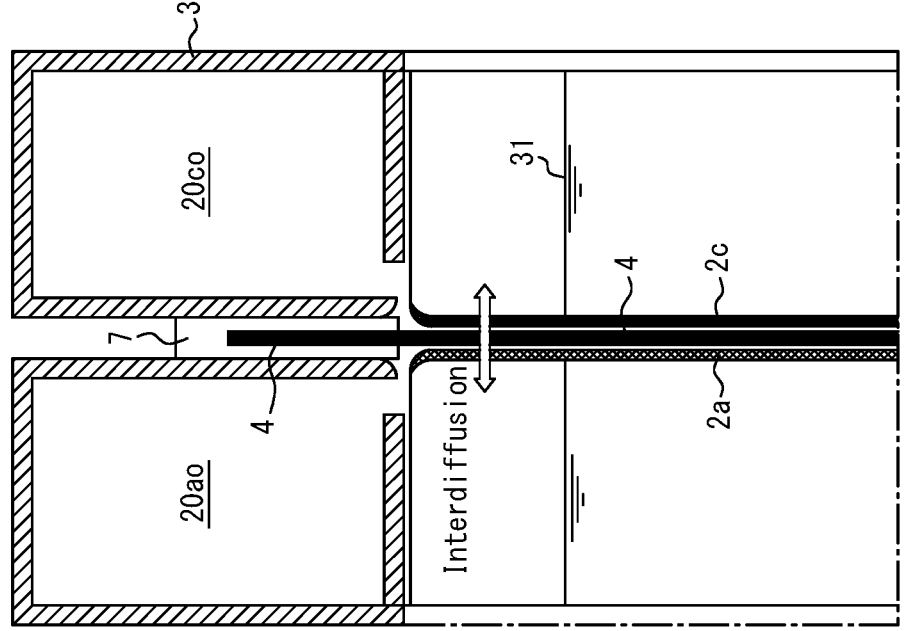
FIG. 4A illustrates one example in which the liquid surface level is adjusted by the liquid surface level control unit.
Figure 4B:
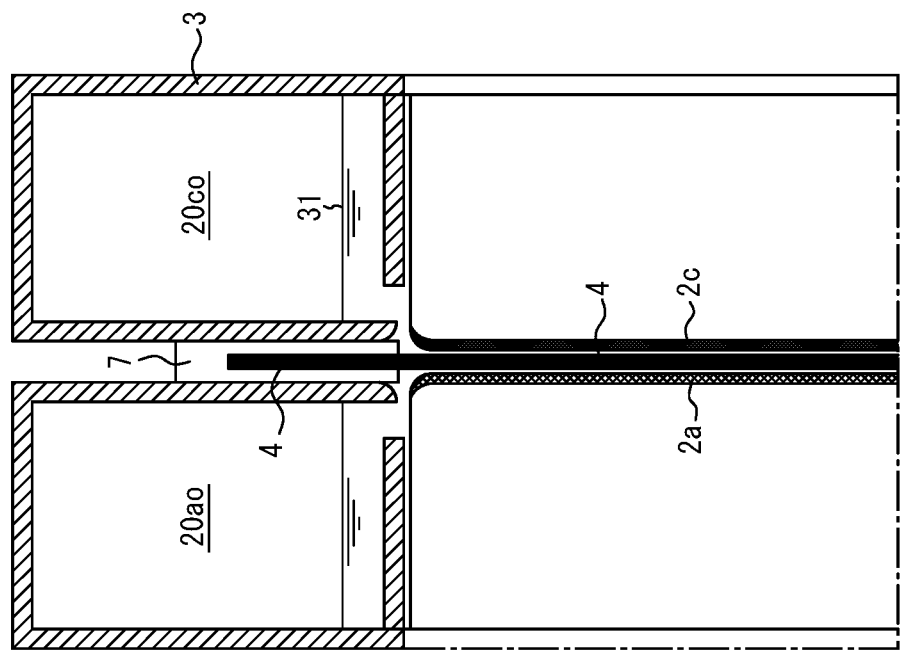
FIG. 4B illustrates one example in which the liquid surface level is not adjusted.

When electric conduction to the electrolyzer 50 and circulation of the electrolytic solution are stopped, the gases generated from the electrodes retains vertically upward in the electrode compartment (FIG. 4A). If the electric conduction stop state continues, the temperature decreases from the operating temperature and the density of the electrolytic solution increases. As a result, the level of the electrolytic solution in the electrolyzer gradually decreases, and the interface between the gas and the electrolytic solution (the liquid surface 31, the water line L) may become below the upper end of the diaphragm 4 separating the anode and the cathode (the upper end of the diaphragm 4 exposed in the electrolysis compartment, the uncovered upper end 4*t*) (FIG. 4B). Here, the speed at which the retaining gas diffuses from one electrode compartment to the other electrode compartment in the case where the diaphragm 4 is exposed is much faster (FIG. 4B) than that in the case where the liquid surface 31 (the water line L) is above the permeable diaphragm 4 exposed in the electrolysis compartment (FIG. 4A). When the gas is diffused into the other electrode compartment, the gases are mixed and the purities of the gases are lowered. In addition, the explosiveness of the gases is increased, and the safety is decreased.

In the electrolysis system of the present embodiment, because the liquid surface level control unit 30 is operated when the electric conduction is stopped, the liquid surface 31 can be controlled so as to be positioned above the upper end of the diaphragm 4 exposed in the electrolysis compartment in the vertical direction, so that mixing of the gases can be suppressed. Further, it is possible to shorten the time required for restarting by maintaining the liquid surface level to be high.

As the liquid surface level control unit 30, a circulation pump for the electrolytic solution, a valve, or the like is preferable. Among them, a circulation pump for the electrolytic solution is more preferable from the viewpoint that the liquid surface level can be controlled more precisely and quickly.

The liquid surface level control unit is preferably a unit that controls the liquid surface level so as to be above the uncovered upper end of the diaphragm in the vertical direction. Note that controlling so as to be above the covered upper end in the vertical direction includes not only positioning the liquid surface level to be always vertically above the uncovered upper end, but also recovering the liquid surface level to be positioned vertically above the uncovered upper end after the liquid surface level becomes below the uncovered upper end.

The liquid surface level control unit 30 preferably adjusts the liquid surface level according to at least one trigger selected from the group consisting of the time duration during which electric conduction is stopped, the temperature of the electrolytic solution, the liquid head pressure of the electrolytic solution, the electrical resistance value, and the liquid surface level of the electrolytic solution in the electrolytic cell (for example, in an electrode compartment). For example, an instrument for measuring the trigger may be attached to the electrolysis system, so that the liquid surface level may be adjusted based on a measurement value of the instrument. For example, an instrument for determining the amount of the electrolytic solution to be injected into an electrolytic cell (for example, into an electrode compartment) in accordance with the measured value may be provided. One of the above triggers may be used alone or two or more of these may be used in a combination. Further, the trigger to be employed may be changed according to the elapsed time after electric conduction is stopped.

Although FIG. 1 illustrates the example in which the liquid surface level control unit 30 is provided separately from the liquid feed pump 71, one pump capable of varying the liquid feed amount according to an input from the trigger may be used or a valve for adjusting the flow rate according to an input from the trigger may be used, for example.

The liquid surface level control unit 30 may adjust the amount or the like of the electrolytic solution to be supplied to the both electrode compartments so that the liquid surface levels of both of the cathode compartment and the anode compartment can be controlled, or may adjust only the amount or the like of the electrolytic solution to be supplied to one electrode compartment. In addition, the same amount of the electrolytic solution may be injected into all of the electrolytic cells (for example, all of the electrode compartments), or the amount of the electrolytic solution to be injected into each electrode compartment may be adjusted according to the trigger value of the each electrode compartment.

If the flow of the electrolytic solution caused by the liquid surface level control unit 30 is too large, the gases dissolved in the electrolytic solution may promote mixing of the gases. Thus, such a situation is not preferable. For example, the time duration during which the liquid surface level control unit is operated is preferably 20% or shorter, more preferably longer than 0% and 20% or shorter, and even more preferably 0.1 to 5% of the time duration during which the electric conduction is stopped (taken to be 100%).

The lower limit of the liquid surface level controlled by the liquid surface level control unit 30 is preferably a position within 100 mm vertically below from the upper end of the diaphragm (for example, the upper end of the diaphragm exposed to the electrolysis compartment, the uncovered upper end 4*t*), more preferably a position within 10 mm from the upper end of the diaphragm, and particularly preferably the upper end of the diaphragm, from the viewpoint of decreasing the exposed area of the diaphragm that is not immersed in the liquid and lowering the gas diffusion rates.

The upper limit of the liquid surface level controlled by the liquid surface level control unit 30 is preferably the upper end of the electrode compartment.

Further, from the viewpoint that the time required for restarting can be further shortened, the upper limit is preferably the position at which a pipe (for example, the anode liquid connection pipe 20*ao* or the cathode liquid connection pipe 20*co* of an internal header type) through which the electrolytic solution is discharged from the electrode compartment is filled with the electrolytic solution. Note that the upper limit of the liquid surface level may be a position of 10 mm or a position of 100 mm from the vertical upper end of the collector pipe as long as the diaphragm is not exposed.

The liquid surface level control unit is preferably a unit for injecting the electrolytic solution into the electrolytic cell (for example, an electrode compartment in which the liquid surface level is lowered) by a liquid feed pump when the liquid surface level of the electrolytic solution in the electrode compartment is positioned below the uncovered upper end of the diaphragm in the vertical direction.

In order to for the liquid surface level control unit to prevent the diaphragm which is not immersed from being exposed for a long time, it is preferable that the liquid surface level control unit 30 is operated to increase the liquid surface level to the upper limit of the liquid surface level at once when the lower limit of the liquid surface level is reached. The upper limit and/or the lower limit of the liquid surface level may be varied in accordance with time duration during which electric conduction is stopped, the temperature of the electrolytic solution, and the like.

The time duration during which electric conduction is stopped used as the trigger may be a continuous cumulative time duration after supply of electric power to the electrolyzer is stopped. The time duration during which electric conduction is stopped is preferably longer than 0 hours and 240 hours or shorter, and more preferably longer than 0 hours and 72 hours or shorter.

The temperature of the electrolytic solution used as the trigger may be the temperature of the electrolytic solution in the electrolysis compartment or the temperature of the electrolytic solution discharged from the electrolyzer.

The liquid surface level control unit 30 is operated when the temperature of the electrolytic solution becomes lower than the temperature of the electrolytic solution upon the previous operation by the liquid surface level control unit 30 by preferably 10° C., more preferably 5° C. In a case where the liquid surface level control unit performs the first control according to the temperature of the electrolytic solution as the trigger after electric conduction is stopped, the liquid surface level control unit may be operated when the temperature of the electrolytic solution becomes the temperature when electric conduction is stopped minus the above temperature difference.

The liquid head pressure of the electrolytic solution used as the trigger may be the liquid head pressure of the electrolytic solution in each electrode compartment of the anode and the cathode. For example, the liquid head pressure may be measured by providing a pressure gauge or the like in the electrode compartment.

The upper limit is preferably a liquid head pressure when the liquid surface is at the upper end of the electrode compartment, and the lower limit is more preferably a liquid head pressure when the liquid surface is at a position within 100 mm vertically below the upper end of the diaphragm (for example, the upper end of the diaphragm exposed to the electrode compartment, the uncovered upper end 4t), more preferably a liquid head pressure when the liquid surface is at a position within 10 mm from the upper end of the diaphragm, and particularly preferably a liquid head pressure when the liquid surface is at the upper end of the diaphragm. Different upper and lower limits may be set for the anode compartment and the cathode compartment.

The electrical resistance value used as the trigger may be the electrical resistance value between the anode and the cathode of the electrolyzer. Because the electrolytic solution is excellent in electrical conductivity, the electrical resistance value between the anode and the cathode decreases as the liquid surface level increases. Accordingly, the liquid surface level control unit 30 is operated when the electric resistance value reaches the upper limit. The lower limit is preferably an electric resistance value when the liquid surface is at the upper end of the electrode compartment, and the upper limit is more preferably an electric resistance value when the liquid surface is at a position within 100 mm vertically below the upper end of the diaphragm, and an electric resistance value when the liquid surface is at a position within 10 mm from the upper end of the diaphragm is more preferable.

The liquid surface level control unit may adjust the liquid surface level according to the liquid surface level of the electrolytic solution in the electrolytic cell. The liquid surface level can be detected by providing a liquid sensor or the like in the electrode compartment, for example.

For example, the liquid surface level control unit is preferably operated when the liquid surface level reaches the upper end of the diaphragm in the vertical direction, is more preferably operated when the liquid surface is at a position within 100 mm vertically below the upper end of the diaphragm, is even more preferably operated when the liquid surface is at a position within 10 mm from the upper end of the diaphragm, and is particularly preferably operated when the liquid surface level is below the upper end of the diaphragm.

Hereinafter, each component or the like of the electrolysis system of the present disclosure will be described in detail.

(Electrolyzer)

In the electrolyzer 50, the diaphragm 4 may be in contact with the anode 2a and the cathode 2c to form the zero gap structure Z from the viewpoint that the gases generated by the electrolysis become less likely to stay in the gap between the electrode and the diaphragm, the gases become less likely to be mixed, and the electric resistance is decreased to achieve an efficient electrolytic reaction (FIG. 3).

Although a gap is provided between the anode 2a, the diaphragm 4, and the cathode 2c in FIGS. 3 and 4, it is preferable that there is no gap in the zero gap structure Z. In an electrolytic cell, when there is a gap between the diaphragm 4 and the anode 2a respective the cathode 2c, a large amount of bubbles generated by electrolysis is accumulated in this portion along with the electrolytic solution, leading to a significant increase in electric resistance. Further, the gases easily mix when electric conduction is stopped. In order to significantly reduce the bath voltage in each electrolytic cell 65, it is effective to minimize the gap between the anode 2a and the cathode 2c (hereinafter also referred to as the "inter-electrode distance") to eliminate influences of the electrolytic solution and bubbles present between the anode 2a and the cathode 2c. The zero gap structure Z is adopted to maintain a state in which the anode 2a and the diaphragm 4 are in contact with each other on the entire surfaces of the electrodes, and the cathode 2c and the diaphragm 4 are in contact with each other, or a state in which the distance between the electrodes is substantially the same as the thickness of the diaphragm 4 on the entire surfaces of the electrodes such that there is almost no gap.

Examples of the technique for reducing the inter-electrode distance include a method in which the anode 2a and the cathode 2c are processed to be perfectly smooth and are then pressed so as to sandwich a diaphragm 4, and a method in which an elastic body such as a spring is disposed between an electrode 2 and the partition wall 1 to support the electrode 2 with the elastic body. For instance, a spring made of a conductive material is attached to the partition wall 1, and the electrode 2 may be attached to the spring. Alternatively, a spring is attached to an electrode rib attached to the partition wall 1, and the electrode 2 may be attached to the spring. In the case of adopting such a configuration using an elastic body, it is necessary to appropriately adjust the strength of the spring, the number of springs, the shape, and the like, as necessary, so as not to introduce non-uniformity in the pressure of the electrode 2 against the diaphragm 4.

The number of the electrolytic cells 65 in the electrolyzer is preferably 50 to 500, and more preferably 70 to 300.

The electrolyzer 50 preferably has 50 to 500 elements 60 (e.g., bipolar elements), more preferably 70 to 300 elements 60, and particularly preferably 100 to 200 elements 60.

In the electrolysis apparatus 70, it is preferable that a plurality of elements 60 are stacked one another having the diaphragms 4 interposed therebetween in the state where the plurality of elements 60 are insulated from each other. With this configuration, the elements 60 are insulated from each other.

Noted that it is preferable that the state in which the plurality of elements 60 are insulated from each other specifically refers to a state where they are insulated between the outer frame 3 of each element 60, and this can be achieved by increasing the insulation property of the gaskets 7 disposed between the elements 60, for example. Further, the insulation as used herein preferably refers to an insulation resistance between the elements 60 of 1 MΩ or more.

The electrolyzer 50 has a cathode compartment 5c and an anode compartment 5a for each electrolytic cell 65. In order to conduct the electrolysis reaction continuously in the electrolyzer 50 to, it is necessary to continuously supply an electrolytic solution that contains sufficient amounts of the raw materials to be consumed by electrolysis into the cathode compartment 5c and the anode compartment 5a of each electrolytic cell 65.

A header attached to the electrolyzer is typically disposed as an internal header or an external header, and either type may be adopted.

The electrolytic cell 65 is connected to an electrolytic solution supply/discharge plumbing system, called a header 10, shared by a plurality of electrolytic cells 65. In general, the anode distribution pipe is called an anode inlet header, the cathode distribution pipe is a cathode inlet header, the anode collector pipe is an anode outlet header, and the cathode collector pipe is called a cathode outlet header. The electrolytic cell 65 is connected to each electrode liquid distribution pipe and each electrode liquid collector pipe through a hose or the like.

The internal header type refers to a type in which an electrolyzer 50 and a header (a pipe for distributing or collecting an electrolytic solution) are integrated. For example, in an internal header-type electrolyzer, an anode inlet header and a cathode inlet header are disposed at a lower part inside the partition wall 1 and/or outer frame 3 and extend in a direction perpendicular to the partition wall 1, whereas an anode outlet header and a cathode outlet header are disposed at an upper part inside the partition wall 1 and/or outer frame 3 and extend in a direction perpendicular to the partition wall 1. For example, in FIG. 3, an anode collector pipe 20ao or a cathode collector pipe 20co provided to each electrode compartment may have a header for discharging the electrolytic solution out of the electrode bath through a pipe in the electrode bath connected in a direction perpendicular to the partition wall 1 (the left-right direction in FIG. 3). A liquid distribution pipe and a liquid collector pipe may be provided inside the electrode compartment (FIG. 4).

The external header type refers to a type in which an electrolyzer 50 and a header (a pipe for distributing or collecting an electrolytic solution) are independent. For example, in the external header type electrolyzer, the anode inlet header and the cathode inlet header, the anode outlet header and the cathode outlet header are independently provided so as to extend parallel to the electrolyzer in a direction perpendicular to the current-carrying surface of the electrolyzer. These headers and each element are connected to each other through a hose. For example, in FIG. 3, each anode liquid connection pipe 20ao or each cathode liquid connection pipe 20co provided to each electrode compartment may extend to the outside of the electrolyzer, and the electrolytic solution of the anode or the electrolytic solution of the cathode may be merged in a single pipe outside the electrolyzer and may be sent to the gas-liquid separation tank.

In the case of the external header type, the electrolyzer 50 may include a header 10 communicating with the electrode compartment 5 outside the outer frame 3 (see FIG. 5 and FIG. 6).

In one example illustrated in FIG. 5 and FIG. 6, a header 10 connecting a pipe for distributing or collecting a gas or an electrolytic solution is attached to the electrolyzer 50. Specifically, the header 10 includes an inlet header for introducing an electrolytic solution into the electrode compartment 5 and an outlet header for discharging a gas or the electrolytic solution from the electrode compartment 5.

In one example, an anode inlet header 10Oai for introducing the electrolytic solution into the anode compartment 5a and a cathode inlet header 10Oci for introducing the electrolytic solution into the cathode compartment 5c are provided at a lower part of the outer frame 3 disposed at the periphery of the partition wall 1, and similarly, an anode outlet header 10Oao for discharging the electrode liquid from the anode compartment 5a and a cathode outlet header 10Oco for discharging the electrolytic solution from the cathode compartment 5c are provided on the sides of the outer frame 3 disposed at the periphery of the partition wall 1.

Further, in one example, the inlet header and the outlet header are provided so as to face each other across the central portion of the electrode compartment 5, in the anode compartment 5a and the cathode compartment 5c.

Particularly, the electrolyzer 50 of this example employs an external header type in which the electrolyzer 50 and the header 10 are independent.

FIG. 6 is a plan view illustrating one example of an electrolyzer of an electrolysis apparatus of an external header type.

Further, in one example illustrated in FIG. 5 and FIG. 6, piping 20 which is piping for collecting a gas or the electrolytic solution distributed or collected through the header 10 is attached to each header 10. Specifically, the piping 20 includes a liquid distribution pipe in communication with the inlet header and a collector pipe in communication with the outlet header.

In one embodiment, an anode liquid distribution pipe 20Oai communicating with the anode inlet header 10Oai and a cathode liquid distribution pipe 20Oci communicating with the cathode inlet header 10Oci are provided below the outer frame 3, and similarly, an anode liquid collector pipe 20Oao communicating with the anode outlet header 10Oao and a cathode liquid collector pipe 20Oco communicating with the cathode outlet header 10Oco are provided on the sides of the outer frame 3.

In the anode compartment 5a and the cathode compartment 5c, the inlet header and the outlet header are preferably provided so as to be separated from each other from the viewpoint of the efficiency of water electrolysis, and are preferably provided so as to face each other across the central portion of the electrode compartment 5. When the shape of the partition wall 1 in plan view is a rectangular shape as illustrated in FIG. 5 and FIG. 6, the anode compartment 5a and the cathode compartment 5c are preferably provided so as to be symmetrical relative to the center of the rectangle.

Although one anode inlet header 10Oai, one cathode inlet header 10Oci, one anode outlet header 10Oao, and one cathode outlet header 10Oco are generally provided to each electrode compartment 5 as illustrated in FIG. 5 and FIG. 6, the present disclosure is not limited to this configuration and they may be provided in plural in each electrode compartment 5.

In addition, although one anode liquid distribution pipe 20Oai, one cathode liquid distribution pipe 20Oci, one anode liquid collector pipe 20Oao, and one cathode liquid collector pipe 20Oco are generally provided to each electrode compartment 5, the present disclosure is not limited to this configuration and they may be shared by the plurality of electrode compartments 5.

In the illustrated example, each electrode compartment 5 has a rectangular parallelepiped shape as a result of a rectangular partition wall 1 and a rectangular diaphragm 4 being arranged in parallel and as a result of an inner surface at a partition wall 1 side of a rectangular parallelepiped outer frame provided at the periphery of the partition wall 1 being perpendicular to the partition wall 1 in plan view. However, in the present embodiment, the shape of the electrode compartment 5 is not limited to the rectangular parallelepiped of the illustrated example, and may be appropriately modified depending on the shapes of the partition wall 1 and the diaphragm 4 in plan view, the angle formed between the inner surface of the outer frame 3 on the partition wall 1 side and the partition wall 1, and any shape may be used as long as the effects of the present disclosure are obtained.

The positional relationship between the electrode compartment 5 and the headers 10 is not particularly limited. As illustrated in FIG. 5 and FIG. 6, when the element 60 is used in such a manner that a given direction D1 along the partition wall 1 is a vertical direction, the inlet headers may be located below or on a side of the electrode compartment 5 (below in the drawing), the outlet headers may be located above or on a side of the electrode compartment 5 (sides in the drawing), and the liquid distribution pipes communicating with the inlet headers may be located below or on a side of the electrode compartment 5 (below in the drawing), and the liquid collector pipes communicating with the outlet headers may be located above or on a side of the electrode compartment 5 (sides in the drawing).

The direction along which the headers 10 extend is not particularly limited.

The direction along which the piping 20 extend is not particularly limited. However, as in one example illustrated in FIG. 5 and FIG. 6, from the viewpoint that the effects of the present disclosure are easily achieved, it is preferable that the liquid distribution pipes (the anode liquid distribution pipe 20Oai, the cathode liquid distribution pipe 20Oci) and the collector pipes (the anode collector pipe 20Oao, the cathode collector pipe 20Oco) each extend in a direction perpendicular to the partition wall 1, and it is further preferable that all of the piping 20 extends in a direction perpendicular to the partition wall 1.

Note that the electrolyzer 50 of the electrolysis apparatus 70 may include a plurality of rectifying plates 6 arranged in parallel to a given direction D1 along the partition wall 1 in order to reduce convection currents generated in the electrolysis compartment 5 due to turbulence in the flow of the gas-liquid in the electrolysis compartment 5 and suppress a local increase in the temperature of the electrolytic solution.

Although the material of the headers is not particularly limited, it is preferable to adopt those which can withstand corrosive properties of the electrolytic solution to be used, operating conditions such as pressure and temperature, and so on. The material of the headers may be iron, nickel, cobalt, PTFE, ETFE, PFA, polyvinyl chloride, polyethylene, or the like.

The electrolyzer 50 of inner header type or outer header type may include a gas-liquid separation box for separating electrolytic solution and gas produced by electrolysis inside the bipolar electrolyzer. The attachment position of the gas-liquid separation box is not particularly limited, yet it may be installed between the anode compartment 5a and the anode outlet header 10ao, or between the cathode compartment 5c and the cathode outlet header 10co.

The surface of the gas-liquid separation box may be coated with a coating material that can sufficiently withstand corrosive properties of the electrolytic solution and operating conditions such as pressure and temperature. An electrically insulating material may be adopted as the coating material with the objective of increasing electric resistance of a leakage current circuit inside the electrolyzer. For example, EPDM, PTFE, ETFE, PFA, polyvinyl chloride, polyethylene, or the like may be adopted as the coating material.

—Electrode—

In electrolysis such as production of hydrogen by alkaline water electrolysis, reduction of energy consumption, specifically reduction of bath voltage presents a significant challenge. Since the bath voltage greatly depends on the electrodes 2, the performance of the two electrodes 2 is important.

The type of the electrodes can be appropriately selected according to the type of the electrolytic reaction. For example, in the case of alkaline water electrolysis, electrodes can be selected so that oxygen gas is generated at the anode and hydrogen gas is generated at the cathode. Alternatively, in the case of brine electrolysis, electrodes can be selected so that chlorine gas is generated at the anode and hydrogen gas is generated at the cathode.

The bath voltage for alkaline water electrolysis includes, in addition to the voltage required for the electrolysis of water that is theoretically determined, an overvoltage of an anode reaction (generating oxygen), an overvoltage of a cathode reaction (generating hydrogen), and a voltage dependent on the distance between the anode 2a and the cathode 2c. As used herein, the term overvoltage refers to a voltage that needs to be applied excessively beyond the theoretical decomposition potential to cause a certain current flow, and its value depends on the current value. An electrode 2 with low overvoltage can reduce power consumption for the same current.

To provide low overvoltage properties, the requirements for the electrode 2 include high conductivity, high oxygen generating ability (or hydrogen generating ability), and high wettability of the electrolytic solution on the surfaces of electrodes 2.

Other than having low overvoltage properties, the electrodes 2 for alkaline water electrolysis are less susceptible to corrosion of the substrates of the electrodes 2 and the catalyst layer, detachment of the catalyst layer, dissolution into the electrolytic solution, and adhesion of inclusions to the diaphragm 4, even in the case of using an unstable current source such as renewable energy.

The electrode substrates of the electrodes are preferably porous bodies for the purpose of increasing the surface areas and promoting efficient removal of gases generated through electrolysis from the electrode surfaces etc. In particular, in the case of a zero-gap electrolyzer, it is necessary to remove the gas evolved from the back side of a surface of an electrode 2 in contact with the diaphragm 4, it is preferable that the surface of the electrode 2 in contact with the diaphragm 4 and the opposite surface penetrate each other. Examples of porous bodies that may be used include a plain weave mesh, a perforated metal, an expanded metal, and a metal foam. Among them, a mesh structure is preferable from the viewpoint of ensuring a specific surface area as a carrier and achieving both defoaming properties.

In a case in which a plain weave mesh is used, a wire diameter of 0.05 mm or more and 1.0 mm or less, a pitch of 20 mesh or more and 60 mesh or less, and an open fraction of 30% or more and 70% or less are preferable for increasing the amount of gas that is produced through increased electrolysis surface area and also for efficiently removing gas produced by electrolysis from the electrode surface, but the dimensions of the plain weave mesh are not particularly limited. More preferably, the wire diameter is 0.1 mm or more and 0.3 mm or less, the pitch is 30 mesh or more and 50 mesh or less, and the open fraction is 40% or more and 60% or less.

In the case of using a punching metal, the size is not particularly limited, yet in order to achieve both an increase in gas generation amount due to increase in electrolytic surface area and efficient removal of gas generated by electrolysis from the electrode surface, and from the viewpoint of mechanical strength, it is preferable that the hole diameter is 2 mm or more and 8 mm or less, the pitch is 2 mm or more and 10 mm or less, the open fraction is 20% or more and 80% or less, and the thickness is 0.5 mm or more and 2 mm or less.

In the case of using an expanded metal, the size is not particularly limited, yet in order to achieve both an increase in gas generation amount due to an increase in electrolytic surface area and efficient removal of gas generated by electrolysis from the electrode surface, and from the viewpoint of mechanical strength, it is preferable that the short way of mesh (SW) is 2 mm or more and 5 mm or less, the long way of mesh (LW) is 3 mm or more and 10 mm or less, the thickness is 0.5 mm or more and 2 mm or less, and the open fraction is 20% or more and 80% or less. More preferably, SW is 3 mm or more and 4 mm or less, LW is 4 mm or more and 6 mm or less, the thickness is 0.8 mm or more and 1.5 mm or less, and the open fraction is 40% or more and 60% or less.

In the case of using a metal foam, the size is not particularly limited, yet in order to achieve both an increase in gas generation amount due to increase in electrolytic surface area and efficient removal of gas generated by electrolysis from the electrode surface, and from the viewpoint of mechanical strength, it is preferable that the porosity is 80% or more and 95% or less and the thickness is 0.5 mm or more and 2.0 mm or less.

A substrate may be used as an electrode, or alternatively, the electrode having a catalyst layer with high reaction activity on the surface of a substrate may be used. However, it is preferable to use an electrode having a catalyst layer with high reaction activity on the surface of a substrate.

The material of the substrate is preferably mild steel, stainless steel, nickel, or a nickel-based alloy from the viewpoint of resistance to the use environment, and is more preferably a substrate containing nickel.

The catalyst layer of the anode 2a preferably has high oxygen generating ability, and it is possible to use, for example, nickel, cobalt, iron, or a platinum group element. In order to achieve a desired activity and durability, the catalyst layer can be formed from an elemental metal, a compound such as an oxide, a complex oxide or alloy composed of a plurality of metal elements, or a mixture thereof. Organic substances such as polymers may be contained in order to improve durability and adhesion to the substrate.

The catalyst layer of the cathode 2c preferably has high hydrogen generating ability, and it is possible to use, for example, nickel, cobalt, iron, or a platinum group element. In order to achieve a desired activity and durability, the catalyst layer can be formed from an elemental metal, a compound such as an oxide, a complex oxide or alloy composed of a plurality of metal elements, or a mixture thereof. Organic substances such as polymers may be contained in order to improve durability and adhesion to the substrate.

Examples of the method of forming the catalyst layer on the substrate include: a thermal spraying method such as plating or plasma spraying; a thermal decomposition method including applying heat to a precursor layer solution applied onto a substrate; a method including mixing a catalyst substance with a binder component and immobilizing it on a substrate; and a vacuum film-forming method such as a sputtering method.

In the case of alkaline water electrolysis, the catalyst layer of the anode preferably has a high oxygen generating ability, and nickel, cobalt, iron, or a platinum group element can be used. In order to achieve a desired activity and durability, the catalyst layer formed from an elemental metal, a compound such as an oxide, a complex oxide or alloy containing a plurality of metal elements, or a mixture thereof is preferable.

In addition, the catalyst layer of the cathode preferably has a high hydrogen generating ability, and nickel, cobalt, iron, platinum group elements, or the like can be used.

—Partition Wall—

The partition wall 1 is preferably made of a material having conductivity from the viewpoint of achieving uniform supply of electric power, and from the perspectives of alkali resistance and heat resistance, preferred materials include nickel, nickel alloy, mild steel, and nickel alloy plated with nickel.

In one embodiment, a partition wall 1 and an outer frame 3 may be joined by welding or any other method to obtain a unified structure. For example, a partition wall 1 may be provided with flange portions that protrude in the direction perpendicular to a plane of the partition wall 1 (anode flange portion protruding on the anode 2a side and cathode flange portion protruding on the cathode 2c side), and these flange portions may constitute part of an outer frame.

The size of each partition wall 1 is not particularly limited, and may be appropriately designed according to the size of the electrode compartment 5.

In particular, when the partition wall 1 has a plate-like shape, the thickness of the partition wall 1 may be 0.5 mm to 5 mm, and the longitudinal length and the lateral length are not particularly limited.

The shape of each partition 1 wall may be a plate-like shape having a predetermined thickness, yet is not particularly limited.

Note that the partition wall 1 may be used such that a given direction D1 along the partition wall 1 is a vertical direction, and specifically, in a case where the shape of the partition wall 1 in plan view is a rectangular shape as illustrated in FIG. 5 and FIG. 6, the partition wall 1 may be used such that a given direction D1 along the partition wall 1 coincides with the direction of one set of sides of two opposite pairs of sides.

—Outer Frame—

Although the shape of each outer frame 3 is not particularly limited as long as it can border the corresponding partition wall 1, the outer frame 3 may have a shape including an inner surface extending along an extension of the partition wall 1 in a direction perpendicular to the plane of the partition wall 1.

The shape of each outer frame 3 is not particularly limited, and may be appropriately determined according to the shape of the partition walls 1 in plan view.

The dimensions of each outer frame 3 are not particularly limited, and it may be designed according to the external dimensions of the electrode compartment 5. The width of the outer frame 3 may be 10 mm to 40 mm, preferably 15 mm to 30 mm, and the extension length of the outer frame 3 is not particularly limited.

The lengths of the anode flange portion and the cathode flange portion in this case are not particularly limited, but may each be 5 mm to 20 mm, and preferably 7.5 mm to 15 mm.

As a material of each outer frame 3, a material having conductivity is preferable, and from the perspectives of alkali resistance and heat resistance, nickel, a nickel alloy, mild steel, and a nickel alloy plated with nickel are preferred.

—Diaphragm—

An ion permeable diaphragm 4 is preferably used as the diaphragm 4 to separate generated gases (for example, in the case of alkaline water electrolysis, hydrogen gas and oxygen gas) while permitting passage of ions. An ion exchange membrane having ion exchange ability or a porous membrane capable of permeating the electrolytic solution may be used as this ion permeable diaphragm 4. The ion permeable diaphragm 4 preferably has a low non-gas permeability, a high ionic conductivity, a low electronic conductivity, and a high strength.

The diaphragm 4 used in the electrolyzer for alkaline water electrolysis is preferably a polysulfone-based membrane.

—Porous Membrane—

A porous membrane has a plurality of fine through-holes, and has a structure that permits the electrolytic solution to pass through the diaphragm 4. Control of the porous structure such as pore size, porosity, and hydrophilicity is very important since the electrolytic solution permeates into the porous membrane to develop ion conduction. On the other hand, the porous membrane is required to prevent not only the electrolytic solution but also the generated gas from passing therethrough, that is, to have gas barrier properties. From this viewpoint control of the porous structure is also important.

The porous membrane has a plurality of fine through-holes, and may be, for example, a polymeric porous membrane, an inorganic porous membrane, a woven fabric, or a nonwoven fabric. These may be prepared with known techniques. Examples of methods by which a polymeric porous membrane may be produced include a phase inversion method (microphase separation method), an extraction method, a stretching method, and a wet gel stretching method.

The porous membrane preferably contains a polymeric material and hydrophilic inorganic particles. The presence of hydrophilic inorganic particles imparts hydrophilicity on the porous membrane.

Examples of polymeric materials that may be used include polysulfone, polyethersulfone, polyphenylsulfone, polyvinylidene fluoride, polycarbonate, tetrafluoroethylene-perfluoroalkyl vinyl ether copolymer, tetrafluoroethylene-ethylene copolymer, polyvinylidene fluoride, polytetrafluoroethylene, perfluorosulfonic acid polymer, perfluorocarboxylic acid polymer, polyethylene, polypropylene, polyphenylene sulfide, poly(p-phenylenebenzobisoxazole), polyketone, polyimide, and polyetherimide. Of these, polysulfone, polyethersulfone, polyphenylsulfone, polyphenylene sulfide, and polytetrafluoroethylene are preferable. These may be used alone or in combination of two or more.

By using polysulfone, polyethersulfone, or polyphenylsulfone as the polymeric material, resistance to high temperature and high concentration alkali solution can be further improved. Polysulfone, polyethersulfone, or polyphenylsulfone may be subjected to crosslinking treatment. The weight-average molecular weight of polysulfone, polyethersulfone, or polyphenylsulfone that has undergone crosslinking treatment, in terms of standard polystyrene-equivalent weight-average molecular weight, is preferably 40,000 or more and 150,000 or less. The method of crosslinking treatment is not particularly limited and may be crosslinking through irradiation with radiation such as an electron beam or γ-rays, thermal crosslinking using a crosslinking agent, or the like. Note that the standard polystyrene-equivalent weight-average molecular weight can be measured by GPC.

A commercially available product can also be used as the polymer material described above. Examples of polysulfone include, for example, "Ultrason® S PSU" (Ultrason is a registered trademark in Japan, other countries, or both, the same applies hereinafter)" of BASF and "UDEL® (UDEL is a registered trademark in Japan, other countries, or both, the same applies hereinafter)" of Solvay Advanced Polymers. Examples of polyethersulfone includes, for example, "Ultrason® E PES (Ultrason is a registered trademark in Japan, other countries, or both, the same applies hereinafter)" of BASF, and "Ladel® A (Ladel is a registered trademark in Japan, other countries, or both, the same applies hereinafter)" of Solbay Advanced Polymers Co., Ltd. Examples of the polyphenylsulfone include "Ultrason® P PPSU (Ultrason is a registered trademark in Japan, other countries, or both, the same applies hereinafter)" of BASF, and "RADEL® R (RADEL is a registered trademark in Japan, other countries, or both, the same applies hereinafter)" of Solvay Advanced Polymers. Examples of polyphenylene sulfide include "TORELINA® (TORELINA is a registered trademark in Japan, other countries, or both, the same applies hereinafter)" of Toray Industries, Inc. Examples of polytetrafluoroethylene includes "Teflon® (Teflon is a registered trademark in Japan, other countries, or both, the same applies hereinafter)" of DuPont Mitsui Chemicals, Inc., and "POLYFLON® (POLYFLON is a registered trademark in Japan, other countries, or both, the same applies hereinafter)" of Daikin Co., and "Fluon® (Fluon is a registered trademark in Japan, other countries, or both, the same applies hereinafter)" of AGC Inc.

The pore size of the porous membrane is preferably controlled in order to obtain appropriate membrane properties such as separation ability and strength. In addition, in the case of use for alkaline water electrolysis, it is preferable to control the pore diameter of the porous membrane from the viewpoint of preventing the mixing of the oxygen gas generated from the anode 2a and the hydrogen gas generated from the cathode 2c and reducing the voltage loss in the electrolysis.

The permeability of the porous membrane per unit area increases, in particular, the ion permeability of the porous membrane improves in electrolysis and the voltage loss tends to reduce with an increase in the average pore diameter of the porous membrane. Further, the contact surface area with alkali water reduces and degradation of the polymer thus tends to be suppressed with an increase in the average pore diameter of the porous membrane.

On the other hand, the separation precision of the porous membrane increases and the gas barrier property of the porous membrane in the electrolysis improves with a decrease in the average pore diameter of the porous membrane. In addition, when hydrophilic inorganic particles having a small particle size, which will be described later, are supported on the porous membrane, they can be held firmly without being dropped. This imparts a high retention capability of the hydrophilic inorganic particles, and helps to maintain the effect over a long period of time.

The average pore diameter is preferably in the range of 0.1 μm or more and 1.0 μm or less, and/or the maximum pore diameter is more than 0.1 μm and 2.0 μm or less. When the pore diameter of the porous membrane is within these ranges, an excellent gas barrier property and a high ion permeability can be achieved. Further, it is preferable that the pore diameter of the porous membrane is controlled in a temperature range which is actually used. Therefore, for example, when the porous membrane is used as the diaphragm 4 for electrolysis in an environment of 90° C., the pore size preferably satisfies the above range at 90° C. In addition, the porous membrane is more preferably has an average pore diameter of 0.1 μm or more and 0.5 μm or less and/or a maximum pore diameter is 0.5 μm or more and 1.8 μm or less as a range in which a further excellent gas barrier property and a high ion permeability can be exhibited as the diaphragm 4 for alkaline water electrolysis.

The average pore diameter and the maximum pore diameter of the porous membrane can be measured by the following method.

An average pore diameter of the porous membrane refers to the average permeable pore size measured by the following method using an integrity tester ("Sartocheck Junior BP-Plus" manufactured by Sartorius Stedim Japan). First, a porous membrane is cut into a predetermined size including a core material, which is used as a sample. The sample is placed in an arbitrary pressure-resistant vessel and the vessel is filled with pure water. Next, the pressure-resistant vessel is held in a constant-temperature bath set at a predetermined temperature, and a measurement is started after the temperature inside the pressure-resistant container has reached a predetermined temperature. Once the measurement is started, the upper surface side of the sample is pressurized with nitrogen, and the numerical values of the pressure and the permeation flow rate when the pure water permeates from the lower surface side of the sample are recorded. The average permeable pore size can be determined from the following Hagen-Poiseuille equation, using a gradient of pressure between 10 kPa and 30 kPa and the permeated water flow rate.

$$\text{Average permeable pore size } (m) = \{32\eta L \mu_0/(\varepsilon P)\}^{0.5}$$

Here, $\eta$ is the viscosity of water (Pa·s), L is the thickness of the porous membrane (m), $\mu_0$ is the apparent flow rate, $\mu_0$ (m/s)=flow rate (m$^3$/s)/area of the flow path (m$^2$). In addition, $\varepsilon$ is the porosity, and P is the pressure (Pa).

The maximum pore size of the porous membrane can be measured by the following method using an integrity tester ("Sartocheck Junior BP-Plus" manufactured by Sartorius Stedim Japan). First, a porous membrane is cut into a predetermined size including a core material, which is used as a sample. The sample is wetted with pure water so that the pores of the porous membrane are impregnated with pure water, and the sample is set in a pressure-resistant vessel for measurement. Next, the pressure-resistant vessel is held in a constant-temperature bath set at a predetermined temperature, and a measurement is started after the temperature inside the pressure-resistant container has reached a predetermined temperature. Once the measurement is started, the nitrogen pressure at the time when the upper surface side of the sample is pressurized with nitrogen and bubbles are continuously generated from the lower surface side of the sample is used as the bubble point pressure. The maximum pore diameter can be determined from the following bubble point equation obtained by transforming the following Young-Laplace equation.

$$\text{Maximum pore size } (m) = 4\gamma \cos \theta / P$$

Here, $\gamma$ is the surface tension (N/m) of water, $\cos \theta$ is the contact angle (rad) between the surface of the porous membrane and water, and P is a bubble point pressure (Pa).

In the diaphragm 4, the porosity of the porous membrane is preferably controlled from the viewpoints of maintaining the gas barrier property, the hydrophilicity, prevention of decrease in the ion permeability due to adhesion of bubbles, and achievement of stable electrolysis performance (low voltage loss, etc.) for a long time.

The lower limit of the porosity of the porous membrane is preferably 30% or more, more preferably 35% or more, and even more preferably 40% or more, from the viewpoint of achieving both a good gas barrier property and a low voltage loss at a high level. The lower limit of the porosity is preferably 65% or less, more preferably 60% or less, and even more preferably 55% or less. When the porosity of the porous membrane is equal to or lower than any of the above upper limits, permeation of ions through the membrane is facilitated and voltage loss of the membrane can be suppressed.

The porosity of the porous membrane refers to the open porosity determined by the Archimedes method, and can be determined by the following equation.

$$\text{Porosity } P(\%) = \rho/(1+\rho) \times 100$$

Here, $\rho = (W3-W1)/(W3-W2)$, where W1 is the dry mass (g) of the porous membrane, W2 is the mass (g) in water of the porous membrane, and W3 is the saturation mass (g) of the porous membrane.

In a method of measuring the porosity, a porous membrane washed with pure water is cut into three sheets with a size of 3 cm×3 cm, to be used as measurement samples. First, W2 and W3 of the samples are measured. Thereafter, the porous membranes are allowed to stand for 12 hours or more in a dryer set at 50° C. to be dried, and W1 is measured. Then, the porosity is obtained from the values of W1, W2, and W3. The porosity is determined for three samples, and the arithmetic average value thereof is used as the porosity P.

The thickness of the porous membrane is not particularly limited, but is preferably 100 μm or more and 700 μm or less, more preferably 100 μm or more and 600 μm or less, and even more preferably 200 μm or more and 600 μm or less.

When the thickness of the porous membrane is equal to or more than any of the above lower limits, a more excellent gas barrier property is obtained and the strength of the porous membrane against impact is further improved. Further, the porous membrane becomes resistant to ripping when being pierced or the like, and the electrodes become resistant to short-circuiting between them. In addition, the gas barrier property is improved. From this viewpoint, the lower limit of the thickness of the porous membrane is more preferably 300 µm or more, even more preferably 350 µm or more, and still even more preferably 400 µm or more. On the other hand, when the thickness of the porous membrane is equal to or less than any of the above upper limits, the permeability of ions is less likely to be inhibited due to the resistance of the electrolytic solution contained in the pores during operation, and a further excellent ion permeability can be maintained. In addition, when the thickness is equal to or less than any of the above upper limits, the voltage loss becomes less likely to increase. In addition, the influence of variation in the thickness of the porous membrane is reduced. From such viewpoints, the upper limit of the thickness of the porous membrane is more preferably 600 µm or less, even more preferably 550 µm or less, and still more even preferably 500 µm or less. Particularly, when the polymer resin includes at least one selected from the group consisting of polysulfone, polyethersulfone, and polyphenylsulfone, such an effect is further improved.

The porous membrane preferably contains hydrophilic inorganic particles so that it can exhibit a high ion permeability and a high gas barrier property. The hydrophilic inorganic particles may be attached to the surface of the porous membrane, or may be partially embedded in a polymer material constituting the porous membrane. Further, when the hydrophilic inorganic particles are enclosed in pores of the porous membrane, the hydrophilic inorganic particles become less likely to be detached from the porous membrane and thus the performance of the porous membrane can be maintained for a long time.

The hydrophilic inorganic particles include at least one inorganic substance selected from the group consisting of oxides or hydroxides of zirconium, bismuth, and cerium; oxides of elements of Group IV in the periodic table; nitrides of elements of Group IV in the periodic table, and carbides of elements of Group IV in the periodic table, for example. Among these, from the viewpoint of chemical stability, oxides of zirconium, bismuth, and cerium, and oxides of Group IV elements in the periodic table are more preferable, oxides of zirconium, bismuth, and cerium are even more preferable, and zirconium oxide is still even more preferable. The particle surfaces of the hydrophilic inorganic particles have polarity. In view of the affinity of oxygen molecules or hydrogen molecules having a low polarity and water molecules having a high polarity in the electrolytic solution as a water solution, it is considered that water molecules having a high polarity is more likely to adsorb to the hydrophilic inorganic particles. Accordingly, when such hydrophilic inorganic particles are present on the surface of the membrane, water molecules are preferentially adsorbed on the surface of the membrane and bubbles such as oxygen molecules and hydrogen molecules are not adsorbed on the surface of the membrane. As a result, adhesion of bubbles to the surface of the porous membrane can be effectively suppressed. However, the advantages and effects of the present embodiment are not limited to these.

The mode particle diameter of the hydrophilic inorganic particles is the particle diameter in a state of secondary particles when the hydrophilic inorganic particles are present in pores in the porous membrane, and is a particle diameter at the maximum value in the particle diameter distribution. The mode particle diameter can be measured by the following method. The porous membrane is dissolved in a solvent capable of dissolving the polymer resin and the polymer resin is removed from the porous membrane. The remaining hydrophilic inorganic particles are washed repeatedly three or more times using the solvent in an amount of 1000 times or more of the weight of the hydrophilic inorganic particles. The washed hydrophilic inorganic particles is used as a measurement sample, and the mode particle diameter is measured from the volume distribution with a laser diffraction and scattering method. The mode particle diameter of the hydrophilic inorganic particles can be measured by a laser diffraction/scattering particle size distribution measuring apparatus ("LA-950" manufactured by HORIBA Ltd.), for example.

The shape of the hydrophilic inorganic particles is preferably fine particles. The mode particle diameter of the hydrophilic inorganic particles as the material used for preparing the porous membrane is preferably 0.1 µm or more and 10 µm or less. When the mode particle diameter of the hydrophilic inorganic particles is 0.1 µm or more, the viscosity of the polymer resin solution containing the hydrophilic inorganic particles is prevented from being excessively high when a porous membrane is produced by a non-solvent induced phase separation method and generation of spots can be effectively prevented during coating, for example, so that a uniform porous membrane tends to be produced. Further, when the hydrophilic inorganic particles are incorporated into the pores of the porous membrane by the non-solvent induced phase separation method, the particle size of the secondary particles formed by aggregation therein becomes larger than the pore diameter of the porous membrane. Thus, it is possible to further suppress detachment of hydrophilic inorganic particles from the porous membrane. From this viewpoint, the mode particle diameter of the hydrophilic inorganic particles is preferably 0.1 µm or more, more preferably 0.5 µm or more, even more preferably 1.0 µm or more, and still even more preferably 2.0 µm or more. When the mode particle diameter of the hydrophilic inorganic particles is 10 µm or less, it is possible to prevent the binding area between the hydrophilic inorganic particles and the porous membrane other than the insides of the pores from becoming excessively small with respect to the size of the hydrophilic inorganic particles, and it is possible to further prevent the hydrophilic inorganic particles from being detached from the porous membrane. Furthermore, it is also possible to further prevent the porous membrane from being damaged by the hydrophilic inorganic particles.

From this viewpoint, the mode particle diameter of the hydrophilic inorganic particles is preferably 10 µm or less, more preferably 8 µm or less, even more preferably 6 µm or less, and still even more preferably 5 µm or less.

When a porous membrane is used as the diaphragm 4, the porous membrane may be used together with a porous support. Preferably, the porous membrane has a structure in which a porous membrane contains a porous support therein, and more preferably a structure in which porous membranes is laminated on both surfaces of a porous support. Alternatively, a structure in which a porous membrane is laminated symmetrically on both surfaces of a porous support may be employed.

Examples of the porous support include, for example, meshes, porous membranes, non-woven fabrics, woven fabrics, composite fabrics including non-woven fabrics and woven fabrics embedded in the non-woven fabrics. These may be used alone or in combination of two or more. More preferred aspects of the porous support include a mesh substrate composed of monofilaments of polyphenylene sulfide, and a composite fabric including a nonwoven fabric and a woven fabric embedded in the nonwoven fabric, for example.

As the ion exchange membrane, there are a cation exchange membrane that selectively permeates cations and an anion exchange membrane that selectively permeates anions, and either one may be used.

The material of the ion exchange membrane is not particularly limited, and any known materials can be used. For example, a fluorine-containing resin or a modified resin of a polystyrene/divinylbenzene copolymer can be suitably used. In particular, a fluorine-containing ion exchange membrane is particularly preferable because it is excellent in, for example, heat resistance and chemical resistance.

The fluorine-containing ion exchange membrane may, for example, be an ion exchange membrane that has a function of allowing selective permeation of ions produced during electrolysis and that contains a fluorine-containing polymer including ion exchange groups. Note that the fluorine-containing polymer including ion exchange groups that is referred to herein is a fluorine-containing polymer that includes ion exchange groups or ion exchange group precursors that can become ion exchange groups upon hydrolysis. For example, the fluorine-containing polymer may be a polymer that includes a hydrofluorocarbon main chain, that includes functional groups that are convertible to ion exchange groups through hydrolysis or the like as pendant side chains, and that can be melt processed.

The molecular weight of the fluorine-containing copolymer is not particularly limited, but is preferably from 0.05 to 50 (g/10 minutes), more preferably from 0.1 to 30 (g/10 minutes), based on the melt flow index (MFI) measured on the precursor in accordance with ASTM:D1238 (measurement conditions: at a temperature of 270° C. under a load of 2160 g).

Examples of the ion exchange group included in the ion exchange membrane include a cation exchange group such as a sulfonic acid group, a carboxylic acid group, and a phosphoric acid group, and an anion exchange group such as a quaternary ammonium group.

The ion exchange membrane can be imparted with excellent ion exchange ability and hydrophilicity by adjusting the equivalent mass EW of the ion exchange group. In addition, it is possible to control to give a large number of smaller clusters (minute portions to which ion exchange groups coordinate and/or adsorb water molecules), and the alkali resistance and the ion selective permeability tend to improved.

This equivalent mass EW can be measured by salt replacement of the ion exchange membrane and back titration of the resultant solution with an alkaline or acid solution. The equivalent weight EW can be adjusted by a copolymerization ratio of a monomer as raw materials, selection of monomer species, or the like.

The equivalent mass EW of the ion exchange membrane is preferably 300 or more from the viewpoint of the hydrophilicity and the water resistance of the membrane, and is preferably 1300 or less from the viewpoint of the hydrophilicity and the ion exchange ability.

The thickness of the ion exchange membrane is not particularly limited, but is preferably in the range of 5 μm to 300 μm from the viewpoint of the ion permeability and the strength.

A surface treatment may be performed for the purpose of improving the hydrophilicity of the surface of the ion exchange membrane. Specific examples thereof include a method of coating hydrophilic inorganic particles such as zirconium oxide, and a method of imparting minute irregularities to the surface.

The ion exchange membrane is preferably used together with a reinforcing material from the viewpoint of the strength of the membrane. The reinforcing material is not particularly limited, and examples thereof include a generally-used nonwoven fabric and woven fabric, and a porous membrane made of various materials. The porous membrane is not particularly limited, but a PTFE film which is stretched and made to be porous is preferable.

—Gasket—

In the electrolyzer 50, as illustrated in FIG. 3, it is preferable that a gasket 7 is sandwiched between the outer frames 3 bordering the partition walls 1 together with the diaphragm 4. The gasket 7 is used for providing a seal against the electrolytic solution and generated gas between the element 60 and the diaphragm 4 and between the bipolar elements 60, and to prevent leakage of the electrolytic solution and generated gas to the outside of the electrolyzer and gas mixture between the bipolar compartments.

The gasket is generally configured with a quadrangular or annular shape obtained by hollowing out the electrode surface in conformity with the surface of the element which is in contact with the frame body. A diaphragm 4 can be stacked between elements by sandwiching the diaphragm 4 with two such gaskets. Furthermore, it is also preferable that the gasket 7 comprises a slit portion capable of accommodating the diaphragm 4 so as to be able to hold the diaphragm 4, and the gasket 7 is provided with an opening which allows the accommodated diaphragm 4 to be exposed on both surfaces of the gasket 7. In this way, the gasket 7 can accommodate the edge portion of the diaphragm 4 in the slit portion and cover the end face of the edge portion of the diaphragm 4. This configuration can more reliably prevent leakage of the electrolytic solution or gas from the end face of the diaphragm 4.

The material of the gasket 7 is not particularly limited, and a known rubber material, resin material, or the like having insulation properties may be selected.

Specific examples of such rubber and resin materials include: rubber materials such as natural rubber (NR), styrene butadiene rubber (SBR), chloroprene rubber (CR), butadiene rubber (BR), acrylonitrile-butadiene rubber (NBR), silicone rubber (SR), ethylene-propylene rubber (EPT), ethylene-propylene-diene rubber (EPDM), fluoro rubber (FR), isobutylene-isoprene rubber (IIR), urethane rubber (UR), and chlorosulfonated polyethylene rubber (CSM); fluoro resin materials such as polytetrafluoroethylene (PTFE), tetrafluoroethylene/perfluoroalkyl vinyl ether copolymer (PFA), tetrafluoroethylene-ethylene copolymer (ETFE), chlorotrifluoroethylene-ethylene copolymer (ECTFE); and resin materials such as polyphenylene sulfide (PPS), polyethylene, polyimide, and polyacetal. Of these, ethylene-propylene-diene rubber (EPDM) and fluororubber (FR) are particularly preferable from the viewpoint of elastic modulus and alkali resistance.

A reinforcing material may be embedded in the gasket 7. This can inhibit squashing of the gasket 7 upon pressing when sandwiched between frames during stacking and makes it easier to prevent damage of the gasket.

A known metal material, resin material, carbon material, or the like can be used as such a reinforcing material. Specific examples include metals such as nickel and stainless steel, resins such as nylon, polypropylene, PVDF, PTFE, and PPS, and carbon materials such as carbon particles and carbon fiber.

The size of the gasket 7 is not particularly limited, and may be designed according to the dimensions of the electrode compartment 5 and the diaphragm and may be set to a width of 10 mm to 40 mm.

In this case, when the gasket 7 is provided with the slit portion, the size of the slit portion may be such that the inner dimension of the slit is larger in length and width than the size of the diaphragm by 0.5 mm to 5 mm.

The thickness of the gasket 7 is not particularly limited and may be designed in accordance with the material and elastic modulus of the gasket 7 and the cell area. The preferred range of the thickness is preferably 1.0 mm to 10 mm, more preferably 3.0 mm to 10 mm.

When the gasket 7 is provided with the slit portion, the width of the opening in the slit portion may be 0.5 to 1.0 times of the thickness of the diaphragm.

The elastic modulus of the gasket 7 is not particularly limited and may be designed in accordance with the materials of the electrodes 2 and the cell area. The elastic modulus is preferably within a range of 0.20 MPa to 20 MPa in terms of tensile stress during 100% deformation, and is more preferably within a range of 1.0 MPa to 10 MPa from viewpoints of sealing properties and cell strength in stacking.

The tensile stress can be measured in accordance with JIS K6251. For example, an Autograph AG manufactured by Shimadzu Corporation may be used.

In particular, it is preferable that the thickness of the gasket 7 is 3.0 mm to 10 mm and the tensile stress at 100% deformation is 1.0 MPa to 10 MPa from the viewpoint of suppressing an increase in the cell voltage due to deflections of the electrodes, and from the viewpoint of the sealing property and the cell strength upon being stacked.

—Liquid Level Gauge—

The electrolyzer 50 preferably has a liquid level gauge capable of measuring the liquid surface in each of the electrode compartments 5a and 5c of the electrolyzer 50. Such a liquid level gauge monitors the liquid surface in the electrode compartment 5a or 5c (monitors the level of the liquid surface in the electrode compartment 5a or 5c), and it is possible to make a determination whether the surface of the diaphragm 4 in the electrode compartment 5a or 5c is in the immersed state where it is immersed in the electrolytic solution or in a non-immersion state where it is not immersed.

The liquid level gauge is not particularly limited, and a direct-view type, a contact type, or a differential pressure type liquid level gauge can be used, for example.

(Pressure Gauge)

The pressure gauge 78 may be installed in the inside the electrolyzer or the outside of the electrolyzer. In the case where a plurality of electrolytic cells are provided, the pressures of the gas discharged from either of the electrodes of all electrolytic cells may be collectively measured.

(Liquid Feed Pump)

The liquid feed pump 71 is not particularly limited and may be configured as appropriate. The liquid feed pump 71 makes the electrolytic solution flowing through the electrolyzer 50 and the piping 81 to be circulated.

Further, a cathode-side liquid feed pump for feeding to the cathode compartment 5c and an anode-side liquid feed pump for feeding to the anode compartment 5a may be provided as the liquid feed pump 71, and they can be operated separately.

(Gas-Liquid Separation Tank)

The gas-liquid separation tanks 72 are preferably tanks for separating the electrolytic solution and gases generated in the electrolyzer from each other, and are preferably an anode-side gas-liquid separation tank 72a for separating gas generated at the anode of the electrolyzer and the electrolytic solution from each other and a cathode-side gas-liquid separation tank 72c for separating gas generated at the cathode of the electrolyzer and the electrolytic solution from each other.

For example, in the case of alkaline water electrolysis, oxygen is generated at the anode and hydrogen at the cathode. In this case, the anode-side gas-liquid separation tank 72a is an oxygen separation tank and the cathode-side gas-liquid separation tank 72c is a hydrogen separation tank. The gas-liquid separation tank 72 for the anode compartment 5a separates oxygen gas generated in the anode compartment 5a and the electrolytic solution from each other, and the gas-liquid separation tank 72 for the cathode compartment 5c separates hydrogen gas generated in the cathode compartment 5c and the electrolytic solution from each other.

The mixtures of the electrolytic solution and the generated gas discharged from the electrolytic cell 65 are made to flow into the gas-liquid separation tank 72. If the gas-liquid separation is not properly performed, the oxygen gas and the hydrogen gas would be mixed when the electrolytic solution from the cathode compartment 5c and the electrolytic solution from the anode compartment 5a are mixed and the purity of the gas would be lowered. In the worst case, there may be formation of an explosive gas.

The gas and the electrolytic solution flowing into each gas-liquid separation tank 72 are separated into a gas phase of the upper layer in the tank and a liquid phase of the lower layer in the tank. The degree of gas-liquid separation is determined by the line rate of the electrolytic solution in the gas-liquid separation tank 72, the floating rate of generated gas bubbles, and the residence time in the gas-liquid separation tank 72.

The electrolytic solution from which the gas has been separated flows out of the tank through the outlet located at the bottom of the tank and flows into the electrolytic cell 65, to thereby form a circulation path. Because oxygen gas and hydrogen gas discharged from the outlets above the tanks both contain alkali mist, a device such as a mist separator or a cooler that can liquefy excess mist is preferably attached downstream to the outlet so that the excess mist is sent back to the gas-liquid separation tank 72.

The gas-liquid separation tank 72 may be provided with a gauge for detection of the liquid surface level of the electrolytic solution stored therein.

The gas-liquid separation tank 72 is preferably provided with a pressure release valve. With this configuration, even if an increase of the pressure occurs due to the gas generated by electrolysis, the pressure can be safely lowered in case where the design pressure is exceeded.

The inlet to the hydrogen separation tank 72 is preferably, but not limited to, located above the liquid surface of the electrolytic solution for improving separation of the liquid and gases.

The liquid surface level of the electrolytic solution in the gas-liquid separation tank 72 is preferably higher than the upper surface of the electrolyzer for the purpose of preventing a decrease in the liquid surface level in the electrolyzer when circulation is stopped, but this is not limitative.

Although a shut-off valve is preferably provided between the electrolytic cell 65 and the gas-liquid separation tank 72, this is not limitative.

An alkali-resistant metal such as nickel is used as the material of the gas-liquid separation tank 72. Alternatively, in the case where a generally-used metal such as iron is used as the material of the tank housing, a material provided with a coating of a fluororesin or the like on the surface inside the tank to be brought in contact with electrolytic solution may be used. The material of the gas-liquid separation tank 72 in the present disclosure, however, is not limited to this.

The capacity of the gas-liquid separation tank 72 is preferably smaller in view of the footprint. However, if the capacity is too small, the liquid surface level in the tank fluctuates when the pressure difference between the cathode 2*c* and the anode 2*a* is increased, or when the electrolytic current value fluctuates. Accordingly, such a fluctuate needs to be taken into consideration.

Similarly, the height of the tank is preferably high because the liquid surface level becomes susceptible to a fluctuation as described above if the height is small.

—Water Replenisher—

The water replenisher 73 is not particularly limited and may be configured as appropriate.

The water may be general tap water. Nevertheless, when a long-term operation is taken into consideration, ion-exchanged water, RO water, ultrapure water, or the like is preferably used.

—Storage Tank—

The electrolysis apparatus 70 may include a storage tank for storing the electrolytic solution. The storage tank is preferably positioned above the electrolyzer 50 of the electrolysis apparatus 70 in the vertical direction. When the storage tank is connected to the electrolyzer 50 by piping or the like, the electrolytic solution in the storage tank can be injected into the electrolyzer by means of gravity. Further, the flow rate can be appropriately adjusted by providing a valve or the like in the piping or the like.

(Piping)

The piping 81 is not particularly limited and may be configured as appropriate.

The piping 81 is piping which permits the electrolytic solution to flow out of the electrolyzer 50. For example, as illustrated in FIG. 1, it can connect between the electrolyzer 50 and the gas-liquid separation tank 72, between the gas-liquid separation tank 72 and the liquid feed pump 71, and between the liquid feed pump 71 and the electrolyzer 50.

Note that the gases separated by the gas-liquid separation tanks 72 are preferably lead to the pressure gauges 78, the pressure control valves 80, the concentration meters through piping used for gases.

(Feed Power Supply)

The feed power supply is preferably a dc power supply.

The feed power supply may be a power supply relying on electric power generated though power generation by an energy source of which output fluctuates such as a renewable energy (variable power supply) or a power supply of which output may be substantially constant (constant power supply), or may be a combination of these. Among these, from the viewpoint of suppressing generation of greenhouse gases and the like, the feed power supply is preferably a variable power supply, and more preferably a power supply relying on at least one renewable energy output selected from the group consisting of wind, solar, hydraulic, tidal, wave, ocean current, and geothermal power outputs, and even more preferably a power supply relying on a solar power output or a power supply relying on a wind power output.

Examples of the constant power supply include a source of electric power supplied through a grid and a storage battery power supply. The source of electric power supplied through a grid may be a power supply relying on a stable source of electric power such as thermal and nuclear power sources, or may be a combination of a variable power supply such as one relying on a renewable energy output or the like and a power supply relying on stable power supply.

Electric power supplied from the power supplies may be converted to a dc power by a rectifier before it is supplied to the electrolyzer. One rectifier may be provided immediately before the electrolyzer, or rectifiers may be provided between the respective power supplies and the electrolyzer.

Further, the electrolysis apparatus 70 preferably further includes a detector for detecting that feeding of electric power is stopped and a controller for automatically stopping the liquid feed pump. The provision of detector and the controller enables efficient reduction of the effects of self-discharge without requiring intervention of humans, even when a power source which fluctuates significantly such as renewable energy is used.

Examples of the electrolysis include water electrolysis such as alkaline water electrolysis, and brine electrolysis. Among them, alkaline water electrolysis in which a large amount of gases are generated from the electrodes and the tightening load on the electrolyzer significantly fluctuate is preferred.

(Positional Relationship of Upper End of Cathode and Diaphragm in Vertical Direction D1)

In the electrolysis apparatus 70, it is preferable that at least a part of the cathode 2*c* is positioned above the uncovered upper end 4*t* of the diaphragm 4 in the vertical direction D1. In this case, in the stopped step, as illustrated in FIGS. 7 and 8, at least a part of the cathode 2*c* can be made to be exposed to the hydrogen gas layer that can be present in the cathode compartment 5*c* while the water line L (the position 31 of the liquid surface) of the electrolytic solution in the anode compartment 5*a* and/or the cathode compartment 5*c* is made to be positioned above the uncovered upper end 4*t* of the diaphragm 4 in the vertical direction. As a result, diffusion and mixing of the gases between the electrode compartments 5*a* and 5*c* through the membrane can be suppressed. In addition, further degradation of the cathode 2*c* can be suppressed when electrolysis is stopped.

With regard to suppression of diffusion and mixing of gases through a diaphragm 4, specifically, in the operation method using a conventional electrolysis apparatus, when both surfaces of the diaphragm 4 are exposed in the gases in the stopped step, a slight amount of the gas in each of the electrode compartments 5*a* and 5*c* would sometimes permeates through the diaphragm 4 and diffuse into each of the electrode compartments 5*a* and 5*c*. In contrast, in an operation method in which the liquid surface of the electrolytic solution in the anode compartment and/or the cathode compartment is made to be positioned above the uncovered upper end of the diaphragm in the vertical direction in the stopped step, a part of the cathode 2*c* is exposed to the hydrogen gas while the water line L (the position of the liquid surface) of the electrolytic solution in the anode compartment 5*a* and/or the cathode compartment 5*c* is made to be positioned above the uncovered upper end 4*t* of the diaphragm 4 in the vertical direction, in the stopped step. As a result, at least one surface of the diaphragm 4 is immersed in the liquid. Accordingly, diffusion and mixing of the gases between the electrode compartments 5*a* and 5*c* can be suppressed.

With regard to suppression of degradation of the cathode 2*c*, specifically, in an operation method of a conventional electrolysis apparatus, a reverse current may be generated in the cathode 2*c* during the stopped step due to charges accumulated in the cathode (and the anode 2*a*) during the electric conduction step. If the reverse current is generated, the cathode per se may be oxidized (a reduction reaction takes place in the cathode compartment in the electric conduction step). There would be a possibility that the cathode $2c$ is degraded when the electric conduction step and the stopped step are repeated. In contrast, in an operation method using the electrolysis apparatus 70, as illustrated in FIG. 7 and FIG. 8, a part of the cathode $2c$ is above the water line L and is exposed to the hydrogen gas, in the stopped step. Thus, even if a reverse current is generated at the cathode $2c$, the hydrogen in contact with the cathode $2c$ is oxidized and oxidation of the cathode $2c$ per se is decreased, so that degradation of the cathode $2c$ can be suppressed.

It is to be noted that the "uncovered upper end of the diaphragm" described above refers to the upper end of the diaphragm 4 in the vertical direction D1. Or, the "uncovered upper end of the diaphragm" refers to the upper end in the vertical direction D1 of a portion of the diaphragm 4 not covered with the gasket 7, a covering material 41, or the like, when a part of the surface of the diaphragm 4 is covered with a gasket or the like used for fixing the diaphragm 4 between the outer frames 3 of the electrolyzer 50, as illustrated in FIG. 7A; or when a part of the surface of the diaphragm 4 is covered with the covering material 41 to be described later together with the gasket 7 as illustrated in FIG. 8, in a part of the upper end side portion in the vertical direction D1 of the diaphragm per se, for example.

Figure 7A:
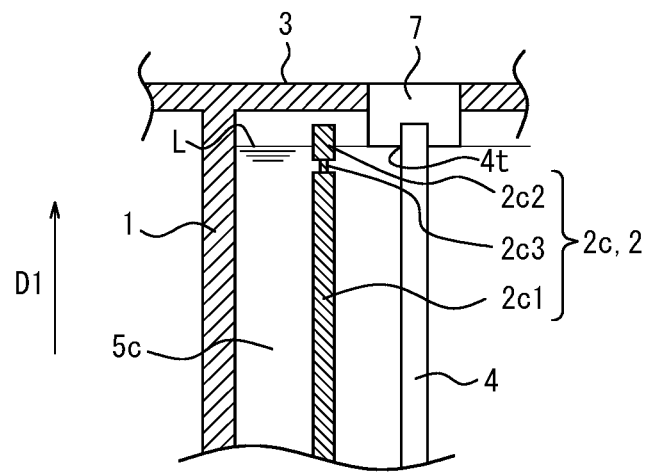
FIG. 7A is a schematic cross-sectional view illustrating the cathode compartment in a cross section in a plane along a vertical direction and a direction perpendicular to the cathode.
Figure 7B:
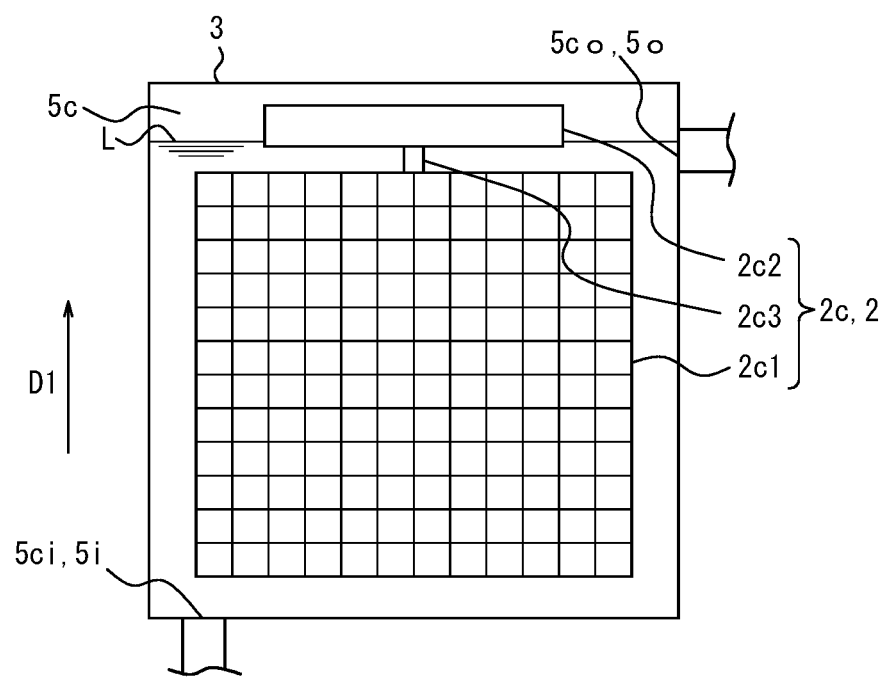
FIG. 7B is a schematic plan view illustrating the cathode compartment.
Figure 8:
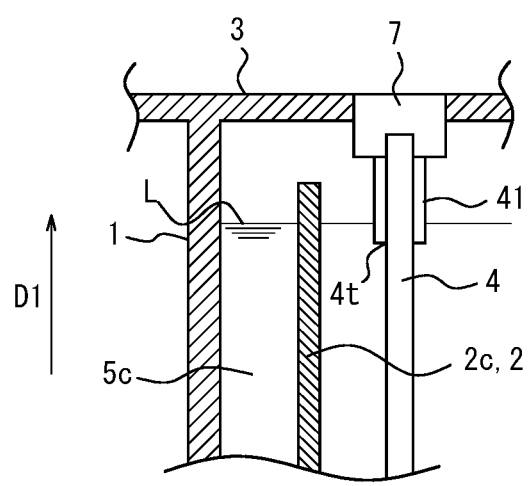
FIG. 8 is a schematic cross-sectional view illustrating a modified example of the cathode compartment illustrated in FIG. 7 in a cross section along a vertical direction and a direction perpendicular to the cathode.

Specifically, as illustrated in FIGS. 7A and 7B which schematically illustrate the cathode compartment $5c$, the cathode $2c$ formed from a cathode main body portion $2c1$ and a cathode auxiliary portion $2c2$ connected to the cathode main body portion $2c1$ by a conductor portion $2c3$ is used as an electrolysis apparatus 70, and at least a part of the cathode auxiliary portion $2c2$ above the vertical direction D1 is positioned above the uncovered upper end $4t$ of the diaphragm 4 in the vertical direction D1. Because the cathode $2c$ has the cathode auxiliary portion $2c2$ in this manner, the water line L of the electrolytic solution is caused to be in a position as illustrated in the figure in the stopped step. As a result, the cathode auxiliary portion $2c2$ oxidizes hydrogen gas even if a reverse current occurs, which prevents degradation of the cathode $2c$, and it is possible to prevent mixing of oxygen into hydrogen present in the cathode compartment $5c$ that may be caused by the surface of the diaphragm 4 being exposed to the gas in the stopped step.

In the electrolysis apparatus 70, instead of a cathode $2c$ which has the cathode auxiliary portion $2c2$ separated from the cathode main body portion $2c1$, a cathode $2c$ may be used which is made only from a cathode main body portion $2c1$, and in which the upper end in the vertical direction D1 of the cathode main body portion $2c1$ is extended to the position of the upper end in the vertical direction D1 of the cathode auxiliary portion $2c2$ in FIG. 7A. However, in the case where the cathode $2c$ has the cathode auxiliary portion $2c2$ as illustrated in FIG. 7A, the cathode $2c$ can be more easily replaced during maintenance as compared with the case where the cathode auxiliary portion is not provided. Further, because it is possible to reduce the size of the cathode $2c$ as a whole by using the cathode auxiliary portion $2c2$, or the cathode auxiliary portion $2c2$ can lower the electrolytic performance during the electric conduction step than that of the cathode main body portion $2c2$ (e.g., the amount of catalyst, etc. is decreased), for example, it is possible to reduce the cost of the cathode $2c$.

Here, similar to the cathode $2c$ in the case where the cathode auxiliary portion $2c2$ is provided, the cathode main body portion $2c1$ is an electrode for electrolyzing the electrolytic solution in the electric conduction step, and may have the configuration and the material similar to those of the cathode $2c$ in the case where the cathode auxiliary portion $2c2$ is provided.

Further, the cathode auxiliary portion $2c2$ can be formed of a material that can be used for the cathode main body portion $2c1$, and can be made of the same material as that of the cathode main body portion $2c1$, but is not particularly limited as long as it can be oxidized in contact with hydrogen when a reverse current is generated. In addition, as illustrated in a schematic plan view of the cathode compartment $5c$ in FIG. 7B, the length in the vertical direction D1 and the length in the direction orthogonal to the vertical direction D1 of the cathode auxiliary portion $2c2$ are smaller than the length in the horizontal direction and the length in the direction orthogonal to the vertical direction D1 of the cathode main body portion $2c1$. The specific dimensions are not particularly limited as long as the cathode auxiliary portion $2c2$ is smaller than the size such that the cathode auxiliary portion $2c2$ is accommodated into the cathode compartment $5c$ together with the cathode main body portion $2c1$, and the length in the vertical direction D1 of the cathode auxiliary portion $2c2$ is preferably 90 mm or less.

Further, the conductor portion $2c3$ which connects the cathode main body portion $2c1$ and the cathode auxiliary portion $2c2$ can be formed of a material that can be used as a substrate of the cathode $2c$, or can be formed of the same material as the cathode main body portion $2c1$.

Although the coating material 41 covering the surfaces of the diaphragm 4 as the one used in the example of FIG. 8 is not used in the example of FIG. 7A, the covering material 41 can also be used.

Further, it is also preferable that the electrolysis apparatus 70 in which at least a part of the cathode $2c$ is positioned above the uncovered upper end $4t$ of the diaphragm 4 is an electrolysis apparatus 70 illustrated in FIG. 8 instead of the example illustrated in FIG. 7. Specifically, in the electrolysis apparatus 70 illustrated in FIG. 8, the surfaces of the diaphragm 4 are covered with the coating material 41 such that the lower end in the vertical direction of the covering material 41 defines the uncovered upper end $4t$ of the diaphragm 4. More specifically, a part of the surface of the diaphragm 4 is covered with the covering material 41 as will be described later together with the gasket 7, so that at least a part of the cathode $2c$ is positioned above the uncovered upper end $4t$ of the diaphragm 4. With this configuration, the same effects as those of the electrolysis apparatus 70 illustrated in FIG. 7 can be achieved, and the structure of the cathode per se can be simplified as compared with the case where the cathode $2c$ has the cathode auxiliary portion $2c2$ as illustrated in FIG. 7.

Here, the coating material 41 is not particularly limited as long as it can cover the surfaces of the diaphragm 4 and the gases in the respective electrode compartments $5a$ and $5c$ partitioned by the diaphragm 4 are prevented from permeating when the portion covered with the coating material 41 of the diaphragm 4 is exposed to the gases, and polytetrafluoroethylene can be used, for example.

Further, the coating material 41 is provided on both surfaces of the diaphragm 4 in FIG. 8. However, the coating material 41 may be provided on only one surface of the diaphragm 4 as long as the gases in the respective electrode compartments $5a$ and $5c$ partitioned by the diaphragm 4 are prevented from permeating when the portion covered with the covering material 41 of the diaphragm 4 is exposed to the gas. In the case where the positions in the vertical direction of the uncovered upper end on the surfaces of the one side and the other side of the diaphragm 4 are different in this manner and the ranges covered by the surfaces of the one side and the other side are thus different, the uncovered upper end of the surface on the lower side in the vertical direction is defined as the "uncovered upper end of the diaphragm".

Further, in the case where a coating material 41 is provided on a surface of the diaphragm 4, it is preferable that the surface is covered with the covering material 41 from the upper end of the diaphragm 4 (covered from a position adjacent to the lower end of the gasket or the like in the case where the upper end side surface of the diaphragm 4 is covered by a gasket or the like), so that the lower end in the vertical direction D1 of the covering material 41 is positioned below the position of the upper end in the vertical direction D1 of the cathode 2c in the vertical direction D1. Further, it is more preferable that the lower end in the vertical direction D1 of the covering material 41 is below the position of the upper end of the cathode 2c, and is above the position which is separated downwardly from the position of the upper end in the vertical direction D1 of the cathode 2c by 20 mm, in the vertical direction D1, and it is more preferable that the lower end is above the position which is separated downwardly from the position of the upper end in the vertical direction D1 of the cathode 2c by 10 mm, in the vertical direction D1.

[Method to Using Electrolysis System (Operation Method)]

A method of using the present embodiment is exemplified by a method of use of the electrolysis system of the present embodiment described above.

For example, it is used by operating the liquid surface level control unit when an electric conduction to the electrolyzer is stopped, to adjust liquid surface level of the electrolytic solution in the electrolysis compartment in the electrolytic cell.

The term when an electric conduction is stopped may be the state when the current value supplied to the electrolyzer becomes 0 A, or may include the state where an operation is performed at a lower current value at which the liquid surface level of the electrolytic solution in the electrolytic cell drops downward in the vertical direction. In addition, it may also include state where the liquid feed pump 71 that circulates the electrolytic solution during the operation of the electrolysis system is stopped. In the electrolysis system and the method of use described above, it is preferable to adjust the liquid surface level by the liquid surface level control unit 30 in response to the trigger or the like in a state in which the electric power (e.g., current) supplied to the electrolyzer is stopped and the liquid feed pump for circulating the electrolytic solution is also stopped.

The above-described electrolysis system is used while the electrolytic solution is made to be circulated during electric conduction. The electrolytic solution mixed with the gas generated at the electrode is discharged from the outlet of the electrolytic cell, and the electrolytic solution is separated from the gas in the gas-liquid separation tank. The electrolytic solution from which the gas is separated is supplied again to the electrolyzer through the liquid feed pump 71 or the like. By circulating the electrolytic solution, the electrolyte concentration in the electrolytic solution can be kept constant and excess heat accompanied by the electrolysis can be cooled, and stable electrolysis can thus be efficiently continued for a long time.

In above-described the water electrolysis system, from the viewpoint of further improving the gas purity, the electrolytic solution discharged from the anode-side gas-liquid separation tank 72a and the cathode-side gas-liquid separation tank 72c is preferably mixed and sent to the bipolar electrolyzer 50 (FIG. 1).

The above-described electrolysis system can be used, for example, for alkaline water electrolysis or brine electrolysis.

In the case of alkaline water electrolysis, an alkaline water solution in which an alkali salt is dissolved may be used as the electrolysis solution, and a water solution of NaOH, a water solution of KOH, or the like may be used for production of hydrogen gas to be generated at the cathode and/or for production of oxygen gas to be generated at the anode. The concentration of the alkali salt is preferably 20 mass % to 50 mass % and more preferably 25 mass % to 40 mass %.

In the case of brine electrolysis, brine and NaOH may be used as the electrolysis solution for production of hydrogen gas to be generated at the cathode and/or for production of chlorine gas to be generated at the anode.

In the above-described use method, the temperature of the electrolytic solution in the electrolyzer 50 is preferably 80° C. to 130° C., more preferably 85° C. to 125° C., and particularly preferably 90° C. to 115° C. When the temperature is set within any of the above ranges, it is possible to effectively suppress degradation of members of the electrolysis system 70 such as the gasket 7 and the diaphragm 4 due to heat while maintaining a high electrolysis efficiency.

Another operation method of the an electrolysis apparatus of the present embodiment can be performed using the above-described electrolysis apparatus 70. Specific examples include a method of operating an electrolysis apparatus 70 using an electrolysis apparatus 70 including an anode compartment 5a having an anode 2a and a cathode compartment 5c having a cathode 2c partitioned from each other by a diaphragm 4, wherein the method includes an electric conduction step in which electrolysis of an electrolytic solution in the anode compartment 5a and the cathode compartment 5c is performed; and a stopped step in which the electrolysis of the electrolytic solution in the anode compartment 5a and the cathode compartment 5c is stopped, and the liquid surface(s) L of the electrolytic solution in the anode compartment 5a and/or the cathode compartment 5c is positioned above the uncovered upper end 4t of the diaphragm 4 in the vertical direction in the stopped step.

According to this operation method, it is possible to further suppress diffusion and mixing of the gases between the electrode compartments 5a and 5c through the diaphragm 4 when electrolysis is stopped.

First, the electric conduction step among the elements of the operation method will be described.

The electric conduction step is a step in which electrolysis of the electrolytic solution in the anode compartment 5a and the cathode compartment 5c is performed. Specifically, in the electrolysis apparatus 70 as illustrated in FIG. 1, forward electric conduction is carried out from the rectifier 74 to electrolyze the electrolytic solution in the anode compartment 5a and the cathode compartment 5c while the electrolytic solution is fed to the anode compartment 5a and the cathode compartment 5c of the electrolyzer 50 using the liquid feed pump 71. Further, the electrolytic solution containing oxygen and the electrolytic solution containing hydrogen generated through the electrolysis are fed from the anode compartment 5a and the cathode compartment 5c to the respective gas-liquid separation tanks 72, for respective gas-liquid separations. Further, the electrolytic solution undergone gas-liquid separation in the gas-liquid separation tanks 72 returns to the liquid feed pump 71 while the water is replenished by the water replenisher 73. In this way, electrolysis can be efficiently performed by electrolyzing the electrolytic solution while circulating the electrolytic solution in the electric conduction step.

Here, in the case of alkaline water electrolysis, forward electric conduction means that electricity is supplied in the direction in which oxygen can be obtained at the anode 2a and hydrogen can be obtained at the cathode 2c.

Here, the electrolytic solution used in the above-described method may be an alkaline water solution containing an alkali salt dissolved therein, and examples include a water solution of NaOH and a water solution of KOH.

The concentration of the alkali salt in the electrolytic solution is preferably 20 mass % to 50 mass % and more preferably 25 mass % to 40 mass %.

Among these, a 25-mass % to 40-mass % water solution of KOH is particularly preferred from the viewpoint of the ionic conductivity, the kinematic viscosity, and the freezing behavior at cold temperatures.

In the electric conduction step, the temperature of the electrolytic solution in the electrolytic cell 65 is preferably 80° C. to 130° C.

When the temperature is set to any of the above ranges, it is possible to effectively suppress degradation of members of the electrolysis apparatus 70 such as the gasket 7 and the diaphragm 4 due to heat while maintaining a high electrolysis efficiency.

The temperature of the electrolytic solution is more preferably 85° C. to 125° C., and particularly preferably 90° C. to 115° C.

In the electric conduction step, the current density applied to the electrolytic cell 65 is preferably from 4 kA/m$^2$ to 20 kA/m$^2$, and more preferably 6 kA/m$^2$ to 15 kA/m$^2$.

In particular, when a variable power supply is used, it is preferable to set the upper limit of the current density within the above range.

It is to be noted that, in the electric conduction step, it is preferable to perform electrolysis at the above preferred current density for the reason of manufacturing, but a flow of the current below the preferred current density is also encompassed in the electric conduction step.

In the electric conduction step, the pressure (gauge pressure) in the electrolytic cell 65 is preferably 3 kPa to 1000 kPa, more preferably 3 kPa to 300 kPa, and even more preferably 3 kPa to 100 kPa.

Next, the stopped step among the elements of the operation method will be described.

The stopped step is a step in which electrolysis of the electrolytic solution in the anode compartment 5a and the cathode compartment 5c is stopped. Specifically, in the electric conduction step, oxygen is generated by electrolysis of the electrolytic solution in the anode compartment 5a, and hydrogen is generated by electrolysis of the electrolytic solution in the cathode compartment 5c. However, such electrolysis is stopped in the stopped step. However, a forward electric conduction may be provided in the stopped step as long as the electric conduction amount is equal to or less than 1% of the maximum forward electric conduction amount (kA/m$^2$) allowed to flow through the electrolysis apparatus 70. Note that the maximum forward electric conduction amount refers to the maximum forward electric conduction amount allowed as an operating condition in the electrolysis apparatus 70 used.

Further, in the stopped step, the liquid feed pump 71 may be stopped or operated, but the liquid feed pump 71 is preferably stopped.

In the above operation method, in the stopped step, as illustrated in FIGS. 7 and 8, it is preferable that the liquid surface(s) (water line(s) of the electrolytic solution) L of the electrolytic solution in the anode compartment 5a and/or the cathode compartment 5c is positioned above the uncovered upper end 4t of the diaphragm 4 in the vertical direction. In this case, it is possible to further suppress diffusion and mixing of the gases between the electrode compartments 5a and 5c through the diaphragm 4 when electrolysis is stopped.

Specifically, in a conventional operation method of the electrolysis apparatus, the electrolytic solution during the electrolytic operation and the gas generated during the operation remain in the form of a gas layer in the electrode compartment of the electrolyzer in the stopped step. As a result, a part (both surfaces) of the diaphragm partitioning the electrode compartment into the anode compartment and the cathode compartment is exposed to the gas layer present in each electrode compartment. When both surfaces of the diaphragm 4 are exposed in the gases, a slight amount of the gas in each of the electrode compartments 5 would sometimes permeates through the diaphragm 4 and diffuse into each of the electrode compartments 5. In contrast, in the above-described operation method, the diaphragm 4 is in a state in which at least one surface of the diaphragm is immersed in the liquid by the above-described countermeasure. Accordingly, diffusion and mixing of the gases between the electrode compartments 5a and 5c through the diaphragm 4 can be suppressed, and it is therefore possible to prevent, for example, a local increase in the hydrogen concentration in oxygen in the anode compartment 5a or the oxygen concentration in hydrogen in the cathode compartment 5c.

It is to be noted that the above-mentioned "uncovered upper end of the diaphragm" (upper end of the diaphragm exposed in the electrode compartment) refers to an upper end of the diaphragm 4 in the vertical direction D1. Or, the "uncovered upper end of the diaphragm" refers to the upper end 4t in the vertical direction D1 of a portion of the diaphragm 4 not covered with the gasket 7, a covering material 41, or the like, when a part of the surface of the diaphragm 4 is covered with a gasket or the like used for fixing the diaphragm 4 between the outer frames 3 of the electrolyzer 50, as illustrated in FIG. 7A; or when a part of the surface of the diaphragm 4 is covered with the covering material 41 together with the gasket 7 as illustrated in FIG. 8, in a part of the upper end side portion in the vertical direction D1 of the diaphragm per se, for example. The positions in the vertical direction of the liquid surface L of the electrolytic solution in the anode compartment 5a and the liquid surface L (liquid surface 31) of the electrolytic solution in the cathode compartment 5c may be the same as or different from each other.

Here, in the above-described operation method, the method of positioning the liquid surface(s) L of the electrolytic solution in the anode compartment 5a and/or the cathode compartment 5c above the uncovered upper end 4t of the diaphragm 4 in the vertical direction is not particularly limited, but a method of injecting the electrolytic solution into the anode compartment 5a and/or the cathode compartment 5c using the liquid feed pump 71 in the stopped step is exemplified, for example.

Specifically, the liquid feed pump 71 can be continuously or intermittently operated, so that the liquid surface(s) L of the anode compartment 5a and/or the cathode compartment 5c is made to be positioned above the uncovered upper end 4t of the diaphragm 4 in the vertical direction in the stopped step. As a result, at least one surface of the diaphragm 4 is made to be immersed in the electrolytic solution in the electrode compartments 5a or 5c. Further, a decrease in the electrolytic solution in the electrode compartment 5a or 5c can be prevented during the stopped step, or the electrolytic solution can be replenished if the electrolytic solution is decreased. In the stopped step, the electrolytic solution may be made to be continuously circulated by continuously operating the liquid feed pump 71.

Further, the liquid feed pump 71 can be continuously or intermittently operated after the transition from the electric conduction step to the stopped step, or can be continuously or intermittently operated after a predetermined time has elapsed after the transition to the stopped step.

Further, in the case where the electrolysis apparatus 70 has a cathode-side liquid feed pump for feeding to the cathode compartment 5c and an anode-side liquid feed pump for feeding to the anode compartment 5a as the liquid feed pump 71, they can be operated separately. With this configuration, it is possible to more efficiently suppress increases in the hydrogen concentration in oxygen and the oxygen concentration in hydrogen in the cathode compartment 5c.

Alternatively, another method of positioning the liquid surface L of the electrolytic solution above the uncovered upper end 4t of the diaphragm 4 in the vertical direction includes providing the electrolysis apparatus 70 with a storage tank for storing the electrolytic solution, and injecting the electrolytic solution in the storage tank into the anode compartment 5a and/or the cathode compartment 5c by means of gravity in the stopped step when the storage tank is positioned vertically above the electrolyzer 50 of the electrolysis apparatus 70. With this configuration, at least one surface of the diaphragm 4 is made to be immersed in the electrolytic solution in the electrode compartment 5a or 5c without using electric power. In this case, the anode compartment 5a and/or the cathode compartment 5c may be filled with the electrolytic solution in the tank by means of gravity.

In the case where the electrolytic solution is injected by the liquid feed pump 71 as described above, the liquid feed pump 71 may be stopped or may be operated to such an extent that the amount of liquid does not change after the injection. Further, in the case where the liquid feed pump 71 is stopped, the inlets and the piping (for example, the electrolytic solution inlet 5i, the anode inlet header (anode inlet side hose) 10Oai, the cathode inlet header (cathode inlet side hose) 10Oci, and the like) below the electrode compartment 5a or 5c in the vertical direction can be closed by, for example, a closing valve or the like after the liquid feed pump 71 is stopped.

Further, in the above-described operation method, it is preferable that liquid level gauges capable of measuring the liquid surfaces L in the anode compartment 5a and the cathode compartment 5c of the electrolyzer 50 are provided in the electrolyzer 50, so that the liquid surfaces L in the anode compartment 5a and the cathode compartment 5c are monitored by the liquid level gauges.

Further, in the case where liquid level gauges are provided, in the stopped step, it is preferable that the liquid surfaces L are monitored by the respective liquid level gauges, and the electrolytic solution is injected by the liquid feed pump 71 into the anode compartment 5a and/or the cathode compartment 5c so that the liquid surface(s) L of the anode compartment 5a and/or the cathode compartment 5c is positioned above the uncovered upper end 4t of the diaphragm 4 in the vertical direction if the liquid surfaces L in the anode compartment 5a and the cathode compartment 5c are positioned below the uncovered upper end 4t of the diaphragm 4 in the vertical direction. Alternatively, in the stopped step, it is also preferable that the position of each liquid surface L is monitored by a liquid level gauge, and when the liquid surfaces L in the anode compartment 5a and the cathode compartment 5c approach the uncovered upper end 4t of the diaphragm 4, and the electrolytic solution is injected into the anode compartment 5a and/or the cathode compartment 5c by the liquid feed pump 71 to push up the liquid surface L.

With this configuration, if the electrolytic solution in the electrode compartments 5a and 5c decreases during the stopped step, at least one of the surfaces of the diaphragm 4 can be kept in the immersion state.

It is to be noted that, in the above-described operation method, it is preferable to use an apparatus in which at least a part of the cathode 2c is positioned above the uncovered upper end 4t of the diaphragm 4, as the electrolysis apparatus 70. In the stopped step, when the liquid surface L of the electrolytic solution in the cathode compartment 5c is positioned above the uncovered upper end 4t of the diaphragm 4 in the vertical direction, at least a part of the cathode 2c can be exposed to the hydrogen gas layer that can be present in the cathode compartment 5c together with this. As a result, diffusion and mixing of the gases between the electrode compartments 5a and 5c through the diaphragm 4 can be suppressed, and furthermore degradation of the cathode 2c can be suppressed, when electrolysis is stopped.

Specifically, with regard to suppression of degradation of the cathode 2c, because a part of the cathode 2c is exposed to the hydrogen gas in the stopped step. Thus, even if the reverse current is generated at the cathode 2c, the hydrogen in contact with the cathode 2c is oxidized to decrease oxidation of the cathode 2c per se, so that degradation of the cathode 2c can be suppressed.

It is to be noted that, from the viewpoint of sufficiently exposing at least a portion of the cathode 2c to the hydrogen gas in the cathode compartment, in the stopped step, it is preferable to form a hydrogen gas layer in the cathode compartment 5c by supplying hydrogen gas to the cathode compartment 5c from the outside of the cathode compartment 5c. Further, in the case where the electrolyzer 50 is provided with a liquid level gauge, it is preferable to monitor whether the liquid surface(s) L of the electrolytic solution in the anode compartment 5a and/or the cathode compartment 5c is positioned above the uncovered upper end 4t of the diaphragm 4 in the vertical direction and is positioned, in the vertical direction, below the position of the cathode 2c in the vertical direction.

Specifically, a method of supplying hydrogen gas to the cathode compartment 5c from the outside of the cathode compartment 5c to form a hydrogen gas layer in the cathode compartment 5c is exemplified by a method of using an electrolysis apparatus 70 in which the position of the upper end of the vertical direction D1 of the cathode electrolytic solution outlet 5co of the cathode compartment 5c is made to be positioned below the position of the upper end of the vertical direction D1 of the inner surface of the outer frame 3 of the cathode compartment 5c in the vertical direction D1 and below the upper end of the cathode compartment 5c the vertical direction D1 in the vertical direction D1. In the stopped step, hydrogen gas is continuously injected via a hydrogen feed port provided in the cathode compartment 5c or the upstream side from the cathode compartment 5c (for example, the piping on the upstream side of the cathode compartment 5c) in the flow direction, so that a hydrogen gas layer (accumulated hydrogen) may be continuously formed above the cathode compartment 5c in the vertical direction D1.

Note that the flow direction refers to the direction along which the electrolytic solution flows in the electrolysis apparatus 70 in the electric conduction step of the electrolysis apparatus 70 or the like.

Further, the hydrogen gas supplied from the outside of the cathode compartment 5c can be injected by connecting the hydrogen feed port to a storage tank for storing hydrogen downstream to the hydrogen separation tank 72a by a pipe and injecting hydrogen from the storage tank, or connecting a movable cylinder filled with hydrogen to the hydrogen feed port and injecting hydrogen from the cylinder.

Further, in the above-described operation method, it is preferable that an electric circuit including the electrolyzer and an electrolytic power source (rectifier) 74 is formed in the electrolysis apparatus 70, and the electric circuit is shut off in the stopped step.

By shutting off in the stopped step as described above, a reverse current generated in the cathode 2c in the stopped step can be decreased. Specifically, shutting off can be achieved by using a circuit breaker, a disconnector, a switch, or a diode for inhibiting a reverse current in the electrical circuit.

In the above-described operation method, in the case where the electrolysis apparatus 70 includes a plurality of elements 60 each including an anode 2a, a cathode 2c, a partition wall 1 separating the anode 2a and the cathode 2c, and an outer frame 3 that borders the partition wall 1, the plurality of elements 60 are preferably superposed with each other having a diaphragm 4 interposed therebetween in a state of being insulated from each other. With this configuration, because the elements 60 are insulated from each other, it is possible to prevent charges accumulated in each element 60 in the electric conduction step from affecting the other elements 60 in the stopped step.

Specifically, the method of bringing the plurality of elements 60 into a state of being insulated from each other is preferably bringing to a state of insulation between the outer frames 3 of the elements 60, and specifically, for example, it can be achieved by enhancing the insulating property of the gasket 7 disposed between the elements 60. In addition, the insulation here preferably has an insulation resistance of 1Ω or more between the elements 60. Alternatively, it can be achieved by covering the surface of the gasket 7 with an insulative resin sheet (for example, a fluororesin such as polytetrafluoroethylene).

In the above operation method, the amount of stored charge of the cathode 2c is preferably 0.1 times or less of the amount of stored charge of the anode 2a. When the electrolysis apparatus 70 is operated using such electrodes, the above-described operation method can be more suitably applied.

The amount of stored charge of the cathode 2c is the amount of stored charge of the cathode 2c of the cathode compartment 5c which controls the amount of hydrogen gas based on this amount of stored charges (C) when electrolysis of the electrolytic solution in the electric conduction step is stopped (at the end of the electric conduction step). Specifically, the amount of stored charge (C) of the cathode 2c is defined as follows. After the cathode 2c is sufficiently reduced by carrying out a forward electric conduction to the cathode 2c, the forward electric conduction is stopped. The potential of the cathode 2c is measured while a reverse current is made to flow. The time integrated value of the reverse current until the potential of the cathode 2c becomes equal to the potential of the anode 2a is used as the amount of stored charges stored in the cathode 2c. In addition, the amount of stored charge (c) of the anode 2a can be measured in the same manner as in the amount of stored charges of the cathode 2c.

Further, in the above operation method, the method of making the amount of stored charge of the cathode 2c to be 0.1 times or less of the amount of stored charge of the anode 2a can be achieved by appropriately selecting the materials of the anode 2a and the cathode 2c or the like.

Although the electrolysis apparatus 70 having the configuration as illustrated in FIG. 1 can be manufactured using the above-described components of the electrolysis apparatus 70 in the above-described operation method, for example, the present disclosure is not limited to this configuration.

In the operation method of the electrolysis apparatus of the above operation method, the above-described effects become remarkable by using a variable power source such as solar or wind power.

EXAMPLES

Results of estimation of a change over time of the hydrogen concentration in oxygen in an anode-side gas-liquid separation box are summarized in Table 1, and results of estimation of a change over time of the oxygen concentration in hydrogen in a cathode-side gas-liquid separation box are summarized in Table 2, when the diaphragm exposure height is retained to the values summarized in Tables 1 and 2 in a large electrolyzer having an electrode area of about 3 square meters. Because the diffusion rate of hydrogen molecules is higher than that of oxygen molecules, the rate of increase in the hydrogen concentration in oxygen is higher than that of the oxygen concentration in hydrogen.

Note that the diaphragm exposure (mm) represents a vertical length from the uncovered upper end of the diaphragm of the diaphragm to the liquid surface level.

TABLE 1

Change over time of hydrogen concentration in oxygen upon stopped

| $H_2/O_2$ [%] | Diaphragm exposure [mm] | | | | |
|---|---|---|---|---|---|
| Time [Hr] | 0 | 1 | 5 | 10 | 100 |
| 1 | 0.00 | 0.01 | 0.05 | 0.09 | 0.45 |
| 5 | 0.00 | 0.05 | 0.25 | 0.47 | 2.18 |
| 10 | 0.01 | 0.11 | 0.50 | 0.93 | 4.24 |
| 24 | 0.02 | 0.25 | 1.18 | 2.18 | 9.45 |
| 48 | 0.04 | 0.50 | 2.33 | 4.26 | 16.89 |
| 72 | 0.05 | 0.75 | 3.44 | 6.23 | 22.79 |
| 96 | 0.07 | 1.00 | 4.53 | 8.10 | 27.54 |

TABLE 2

Change over time of oxygen concentration in hydrogen upon stopped

| $O_2/H_2$ [%] | Diaphragm exposure [mm] | | | | |
|---|---|---|---|---|---|
| Time [Hr] | 0 | 1 | 5 | 10 | 100 |
| 1 | 0.00 | 0.01 | 0.03 | 0.05 | 0.26 |
| 5 | 0.00 | 0.03 | 0.14 | 0.27 | 1.27 |
| 10 | 0.00 | 0.06 | 0.28 | 0.53 | 2.52 |
| 24 | 0.01 | 0.14 | 0.68 | 1.27 | 5.87 |
| 48 | 0.02 | 0.29 | 1.36 | 2.53 | 11.28 |
| 72 | 0.03 | 0.43 | 2.03 | 3.76 | 16.19 |
| 96 | 0.04 | 0.58 | 2.69 | 4.97 | 20.60 |

Example 1

Figure 9:
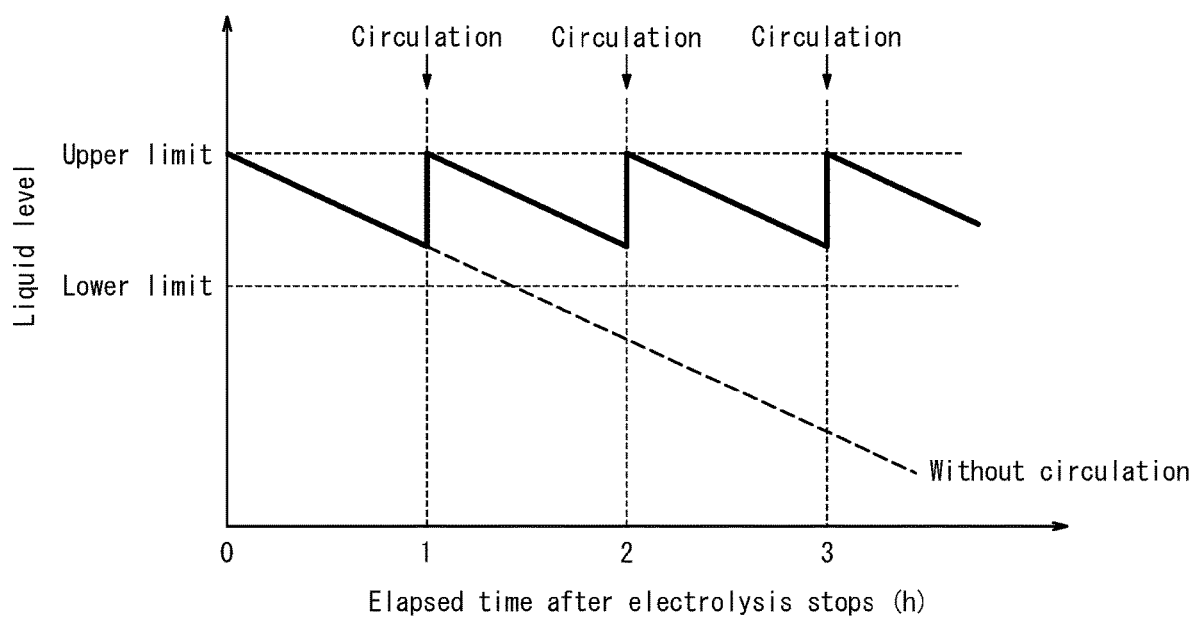
FIG. 9 illustrates a result of Example 1.

In an alkaline water electrolysis system including a large electrolyzer 50 including a plurality of large electrolytic cells which each have an electrode area of about 3 square meters and are stacked one another, a circulation pump 71 for an electrolytic solution, and a heat exchanger 79, a liquid surface level control unit 30 was instructed to cause the electrolytic solution to be circulated every hour after electric conduction was stopped. FIG. 9 illustrates a graph of a change in liquid surface level over time. After the electric conduction was stopped, the temperature of the electrolytic solution decreased over time due to the absence of the heat generation source, and as a result, the density of the electrolytic solution increased, which resulted in a gradual decrease in the liquid surface level. In such a situation, by making the electrolytic solution to be circulated every hour, the liquid level was restored before the liquid surface reached the lower limit.

In FIG. 9, the upper limit of the liquid level (i.e., the liquid surface) represents the upper end of the electrode compartment, and the lower limit is a position 50 mm vertically downward from the uncovered upper end 4t.

Example 2

Figure 10:
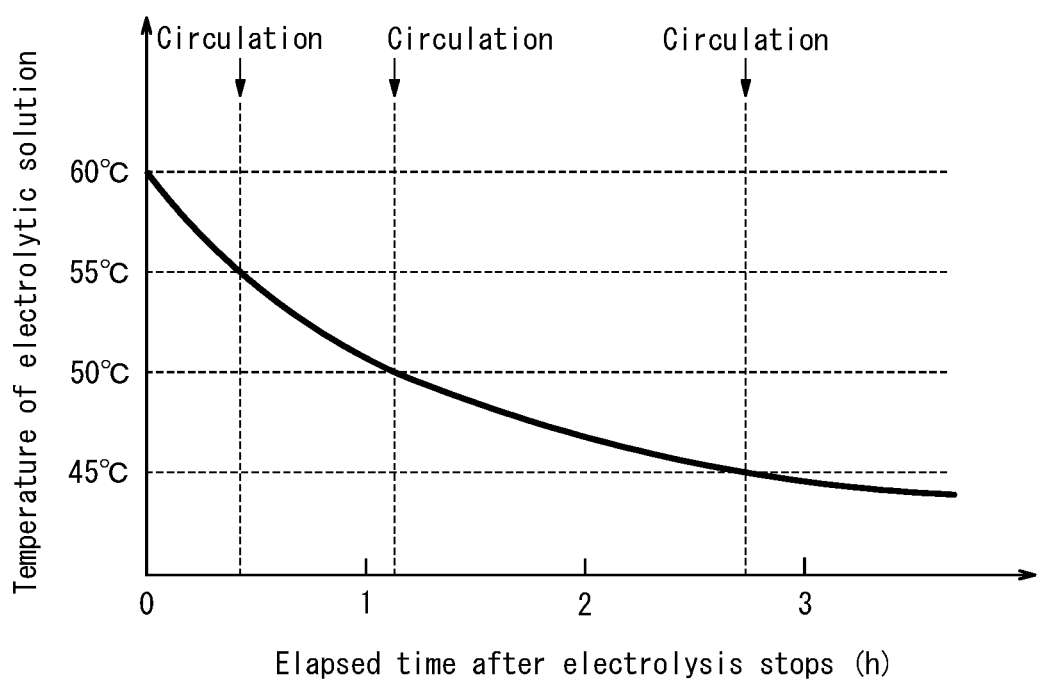
FIG. 10 illustrates a result of Example 2.

In an alkaline water electrolysis system including a large electrolyzer 50 including a plurality of large electrolytic cells which each have an electrode area of about 3 square meters and are stacked one another, a circulation pump 71 for an electrolytic solution, and a heat exchanger 79, a liquid surface level control unit 30 was instructed to cause the electrolytic solution to be circulated every time the electrolytic solution decreases by 5° C. from the temperature of the electrolytic solution at the time when the electric conduction was stopped. FIG. 10 illustrates a graph of the temperature of the electrolytic solution over time. After the electric conduction was stopped, the temperature of the electrolytic solution decreased over time due to the absence of the heat generation source, and as a result, the density of the electrolytic solution increased, which resulted in a gradual decrease in the liquid surface level.

In such a situation, by making the electrolytic solution to be circulated every time the temperature of the electrolytic solution decreased by a certain extent, the liquid level was restored before the liquid surface reached the lower limit. However, circulating at all times is not preferable because the gas dissolved in the electrolytic solution may promote mixing of the gases.

Example 3

In an alkaline water electrolysis system including a large electrolyzer 50 including a plurality of large electrolytic cells which each have an electrode area of about 3 square meters and are stacked one another, a circulation pump 71 for an electrolytic solution, and a heat exchanger 79, an anode electrolytic solution head pressure La [kPa] and a cathode electrolytic solution head pressure Lc [kPa] were obtained from the respective pressures of the corresponding part using the following equations when circulation of the electrolytic solution was stopped.

$$La = Pia - Poa$$

$$Lc = Pic - Poc$$

Here, Pia represents the pressure at the anode electrolytic solution inlet [kPa], Poa represents the oxygen gas pressure [kPa], Pic represents the pressure at the cathode electrolytic solution inlet [kPa], and Poc represents the hydrogen gas pressure [kPa]. Further, the liquid surface level of the anode electrolytic solution Ha[m] and the liquid surface level of the cathode electrolytic solution Hc[m] can be obtained by dividing the liquid head pressures by the density of the electrolytic solution and the gravitational acceleration.

$$Ha = La \times 1000 / \rho a \cdot g$$

$$Hc = Lc \times 1000 / \rho c \cdot g$$

Here, $\rho a$ represents the density of the anode electrolytic solution [kg/m³], $\rho c$ represents the density of the cathode electrolytic solution [kg/m³], g represents the gravitational acceleration [m/s²]. Here, in the case of the single-liquid circulation system, it can be assumed that $\rho a = \rho c$. Because the density of the electrolytic solution generally has a temperature dependency, correction of the density is required.

When Ha or Hc reaches a predetermined value by a calculation from the pressure difference when the electrolytic solution is stopped, the liquid level can be restored before the liquid surface reaches the lower limit by instructing the liquid surface level control unit 30 to perform the circulation of the electrolytic solution.

Example 4

In an alkaline water electrolysis system including a large electrolyzer 50 including a plurality of large electrolytic cells which each have an electrode area of about 3 square meters and are stacked one another, a circulation pump 71 for an electrolytic solution, and a heat exchanger 79, an average liquid surface level in the electrolyzer was evaluated by providing a means for measuring an inter-electrode resistance value of the electrolyzer during electric conduction and when circulation of the electrolytic solution is stopped. Because the electrolytic solution is a good conductor and the resistance values of the other paths are relatively negligible, the average liquid surface L [m] and the electrical resistance value R [Ω] have the following relationship.

$$1/R = a \cdot L + b$$

$$L = a'/R + b'$$

Here, a, b, a', and b' are coefficients. The liquid level can be restored before the liquid surface level reaches the lower limit by instructing the liquid surface level control unit 30 to cause the electrolytic solution to be circulated when L reaches a predetermined value.

INDUSTRIAL APPLICABILITY

According to the present disclosure, it is possible to suppress degradation of the anode and the cathode that may occur when electrolysis is stopped when a variable power source such as solar or wind power is used.

REFERENCE SIGNS LIST

1 Partition wall
2 Electrode
2a Anode
2c Cathode
2c1 Cathode main body
2c2 Cathode auxiliary portion
2c3 Conductor portion
2e Conductive elastic body 2r Current collector
3 Outer frame
4 Diaphragm
41 Coating material
4t Uncovered upper portion of diaphragm
5 Electrode compartment
5a Anode compartment
5c Cathode compartment
5i Electrolytic solution inlet
5o Electrolytic solution outlet
5ai Anode electrolytic solution inlet
5ao Anode electrolytic solution outlet
5ci Cathode electrolytic solution inlet
5co Cathode electrolytic solution outlet
6 Rectifier plate (rib)
7 Gasket
10 Header
10O External header
10Oai Anode inlet header (anode inlet side hose)
10Oao Anode outlet header (anode outlet side hose)
10Oci Cathode inlet header (cathode inlet side hose)
10Oco Cathode outlet header (cathode outlet side hose)
20 Piping
20Oai Anode liquid distribution pipe
20Oao, 2Oao Anode liquid collector pipe
20Oci Cathode liquid distribution pipe
20Oco, 20co Cathode liquid collector pipe
30 Liquid surface level control unit
31 Liquid surface
50 Electrolyzer
51g Loose head
51h Fast head
51i Insulating plate
51a Anode terminal element
51c Cathode terminal element
51r Tie rod
51i Insulating plate
60 Element (bipolar element)
65 Electrolytic cell
70 Water electrolysis system, electrolysis apparatus
71 Liquid feed pump
72a Anode-side gas-liquid separation tank
72c Cathode-side gas-liquid separation tank
73 Water replenisher
74 Rectifier
77a Anode electrolytic solution flow meter
77c Cathode electrolytic solution flow meter
78a Oxygen gas pressure gauge
78c Hydrogen gas pressure gauge
79 Heat exchanger
80a Oxygen gas pressure control valve
80c Hydrogen gas pressure control valve
81a Anode electrolytic solution return piping
81c Cathode electrolytic solution return piping
82a Pressure gauge at anode electrolytic solution inlet
82c Pressure gauge at cathode electrolytic solution inlet
D1 Given direction along partition (vertical direction)
L Water line
Z Zero gap structure

The invention claimed is:

1. An electrolysis system comprising:
an electrolyzer in which an anode and a cathode are overlapped one another having a diaphragm interposed therebetween; and
a liquid surface level control unit that is operated when an electric conduction to the electrolyzer is stopped to adjust a liquid surface level of an electrolytic solution in the electrolytic cell,
wherein a time duration during which the liquid surface level control unit is operated is more than 0% and less than or equal to 20% of a time duration during which the electric conduction is stopped which is taken to be 100%,
the liquid surface level control unit adjusts the liquid surface level according to the time duration during which the electric conduction is stopped, and
the liquid surface level control unit adjusts the liquid surface level according to an electric resistance value between the anode and the cathode.

2. The electrolysis system according to claim 1, wherein the liquid surface level control unit is a unit for controlling the liquid surface level so as to be above an uncovered upper end of the diaphragm in a vertical direction.

3. The electrolysis system according to claim 1, wherein the liquid surface level control unit is a circulation pump for the electrolytic solution.

4. The electrolysis system according to claim 1, wherein the liquid surface level control unit adjusts the liquid surface level according to a temperature of the electrolytic solution.

5. The electrolysis system according to claim 1, wherein the liquid surface level control unit adjusts the liquid surface level according to a liquid head pressure of the electrolytic solution.

6. The electrolytic system according to claim 1, wherein the liquid surface level control unit adjusts the liquid surface level according to the liquid surface level of the electrolytic solution in the electrolytic cell.

7. The electrolysis system according to claim 6, wherein the liquid surface level control unit is a unit that injects the electrolytic solution into the electrolytic cell by a liquid feed pump when the liquid surface level of the electrolytic solution is positioned below the uncovered upper end of the diaphragm in the vertical direction.

8. The electrolysis system according to claim 1, wherein the electrolysis system is for alkaline water electrolysis.

9. A method of use of the electrolysis system according to claim 1, the method comprising:
operating the liquid surface level control unit when an electric conduction to the electrolyzer is stopped to adjust a liquid surface level of an electrolytic solution in the electrolytic cell, wherein a time duration during which the liquid surface level control unit is operated is more than 0% and less than or equal to 20% of a time duration during which the electric conduction is stopped which is taken to be 100%, wherein the liquid surface level control unit adjusts the liquid surface level according to the time duration during which the electric conduction is stopped, and wherein the liquid surface level control unit adjusts the liquid surface level according to an electric resistance value between the anode and the cathode.

10. A method of operating an electrolysis apparatus comprising an anode compartment having an anode and a cathode compartment having a cathode, partitioned by a diaphragm, the method comprising:
an electric conduction step in which electrolysis of an electrolytic solution in the anode compartment and the cathode compartment is performed; and
a stopped step in which the electrolysis of the electrolytic solution in the anode compartment and the cathode compartment is stopped, wherein a liquid surface of the electrolytic solution in the anode compartment and/or the cathode compartment is positioned above an uncovered upper end of the diaphragm in a vertical direction in the stopped step, the electrolysis apparatus comprises a storage tank for storing the electrolytic solution, the storage tank being positioned above an electrolyzer in the electrolysis apparatus in the vertical direction, and the electrolytic solution in the storage tank is injected into the anode compartment and/or the cathode compartment by means of gravity in the stopped step so that the liquid surface of the anode compartment and/or the cathode compartment is positioned above the uncovered upper end of the diaphragm in the vertical direction, wherein the stopped step occurs after the electric conduction step.

11. The method of operating an electrolysis apparatus according to claim 10, wherein, in the stopped step, the liquid surfaces of the electrolytic solution in the anode compartment and the cathode compartment are monitored by a liquid level gauge for measuring the liquid surfaces, and when the liquid surfaces of the anode compartment and the cathode compartment are positioned below the uncovered upper end of the diaphragm in the vertical direction, the electrolytic solution is injected into the anode compartment and/or the cathode compartment by a liquid feed pump so that the liquid surface of the anode compartment and/or the cathode compartment is positioned above the uncovered upper end of the diaphragm in the vertical direction.

12. The method of operating an electrolysis apparatus according to claim 11, wherein the liquid feed pump is continuously or intermittently operated in the stopped step so that the liquid surface of the anode compartment and/or the cathode compartment is positioned above the uncovered upper end of the diaphragm in the vertical direction.

13. The method of operating an electrolysis apparatus according to claim 10, wherein at least a part of the cathode is present above the uncovered upper end of the diaphragm in the vertical direction.

* * * * *